United States Patent
Cofler et al.

(10) Patent No.: US 12,533,906 B2
(45) Date of Patent: Jan. 27, 2026

(54) PRINTING FORMULATIONS AND METHODS

(71) Applicant: VELOX-PUREDIGITAL LTD., Rosh Haiin (IL)

(72) Inventors: Marian Cofler, Kfar Yona (IL); Adrian Cofler, Gan Yavne (IL); Hanady Yaseen, Kfar Bara (IL); Ido Gal, Kfar-Saba (IL); Shai Ayleen, Karnei Shomron (IL)

(73) Assignee: VELOX-PUREDIGITAL LTD., Rosh Haiin (IL)

( * ) Notice: Subject to any disclaimer, the term of this patent is extended or adjusted under 35 U.S.C. 154(b) by 0 days.

(21) Appl. No.: 18/322,828

(22) Filed: May 24, 2023

(65) Prior Publication Data
US 2023/0294443 A1    Sep. 21, 2023

Related U.S. Application Data

(63) Continuation of application No. 16/079,750, filed as application No. PCT/IL2017/050229 on Feb. 23, 2017, now Pat. No. 11,697,300.

(30) Foreign Application Priority Data

Feb. 25, 2016 (IL) ........................................... 244302
Feb. 25, 2016 (IL) .......................................... 244305
Feb. 25, 2016 (IL) .......................................... 244306

(51) Int. Cl.
*B41M 5/52* (2006.01)
*B41M 5/00* (2006.01)
(Continued)

(52) U.S. Cl.
CPC ........ *B41M 5/5209* (2013.01); *B41M 5/0011* (2013.01); *B41M 7/0081* (2013.01);
(Continued)

(58) Field of Classification Search
CPC .............. B41M 5/0011; B41M 5/5209; B41M 7/0081; C09D 11/40; C09D 11/54; C09D 11/101
See application file for complete search history.

(56) References Cited

U.S. PATENT DOCUMENTS 6,610,388 B2    8/2003  Xing et al.
2003/0021961 A1    1/2003  Ylitalo et al.
(Continued)

FOREIGN PATENT DOCUMENTS

CN    104039898 A    9/2014
EP    1 927 632 A1    6/2008
(Continued)

OTHER PUBLICATIONS

Machine Translation of JP 2008-208321 A (Year: 2008).*
(Continued)

*Primary Examiner* — Travis M Figg
*Assistant Examiner* — Sathavaram I Reddy
(74) *Attorney, Agent, or Firm* — Vorys, Sater, Seymour and Pease, LLP; Anthony P. Venturino; Maryellen Feehery Hank

(57) ABSTRACT

Provided are pre-coat formulations, ink formulations, ink systems and printing methods for patterning a surface with a desired pattern.

18 Claims, 9 Drawing Sheets

(51) Int. Cl.
*B41M 7/00* (2006.01)
*C09D 11/101* (2014.01)
*C09D 11/40* (2014.01)
*C09D 11/54* (2014.01)

(52) U.S. Cl.
CPC ............ *C09D 11/101* (2013.01); *C09D 11/40* (2013.01); *C09D 11/54* (2013.01)

(56) References Cited

U.S. PATENT DOCUMENTS

| | | | |
|---|---|---|---|
| 2003/0067527 A1* | 4/2003 | Temple | B41M 7/0081 347/101 |
| 2010/0007692 A1 | 1/2010 | Vanmaele et al. | |
| 2013/0344306 A1 | 12/2013 | Arai et al. | |
| 2014/0285568 A1* | 9/2014 | Loccufier | C09D 11/322 522/18 |
| 2016/0122859 A1 | 5/2016 | Cushen et al. | |

FOREIGN PATENT DOCUMENTS

| | | |
|---|---|---|
| EP | 2 033 949 A1 | 3/2009 |
| EP | 2 604 663 A1 | 6/2013 |
| EP | 2 960 306 A1 | 12/2015 |
| EP | 3 034 312 A1 | 6/2016 |
| JP | 2007-237733 A | 9/2007 |
| JP | 2008208321 A | 9/2008 |
| JP | 2008-248251 A | 10/2008 |
| JP | 2012011778 A | 1/2012 |
| JP | 2012192610 A | 10/2012 |
| JP | 2012526001 A | 10/2012 |
| JP | 2015-090903 A | 5/2015 |
| JP | 2015-205510 A | 11/2015 |
| RU | 2348534 C1 | 3/2009 |
| WO | 00/30856 A1 | 6/2000 |
| WO | 01/96121 A1 | 12/2001 |
| WO | 2008/030555 A2 | 3/2008 |
| WO | 2008/061957 A1 | 5/2008 |
| WO | 2008/074759 A1 | 6/2008 |
| WO | 2008/077045 A2 | 6/2008 |
| WO | 2014/108077 A1 | 7/2014 |
| WO | 2015/169657 A1 | 11/2015 |

OTHER PUBLICATIONS

"Screen Printing Tips", 1st edition, Editorial Department of "Screen Printing", p. 238, Printing Industry Press (Sep. 30, 2007).

* cited by examiner

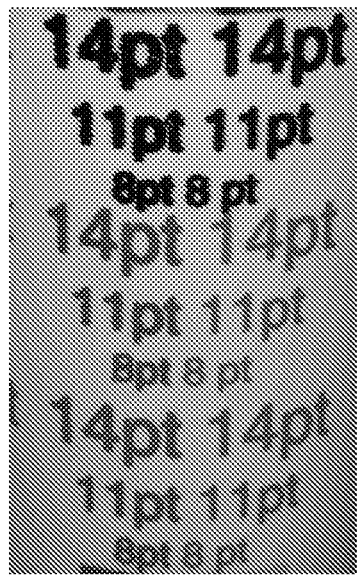 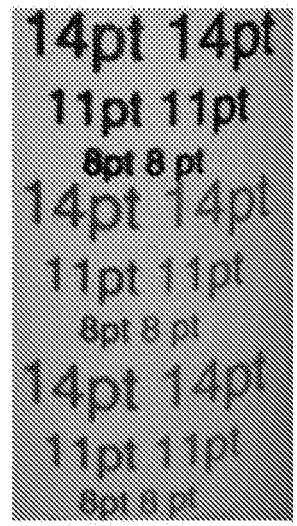
Fig. 7A　　　　　Fig. 7B
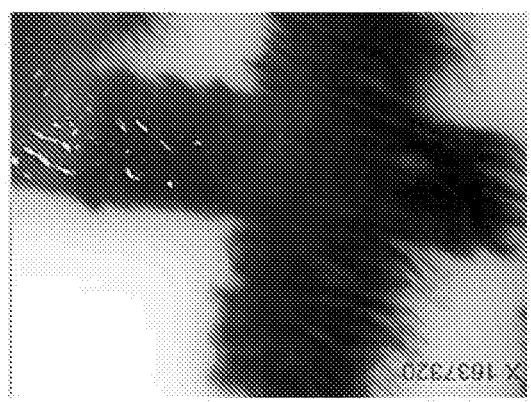 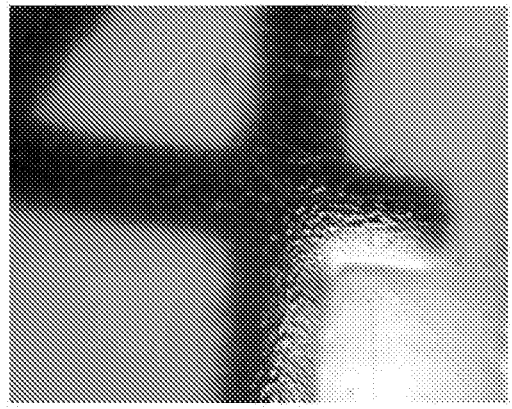
Fig. 8A　　　　　Fig. 8B

PRINTING FORMULATIONS AND METHODS

CROSS-REFERENCE TO RELATED APPLICATIONS

This application is a continuation of U.S. patent application Ser. No. 16/079,750 filed on Aug. 24, 2018, which was a 371 of PCT/IL2017/050229 filed on Feb. 23, 2017, which claims the benefit of priority from Israeli Patent Application No. 244302 filed on Feb. 25, 2016, Israeli Patent Application No. 244305 filed on Feb. 25, 2016, and Israeli Patent Application No. 244306 filed on Feb. 25, 2016, the contents of each of which are incorporated herein by reference in its entirety.

TECHNOLOGICAL FIELD

The invention relates to formulations and methods for printing patterns on various surfaces.

BACKGROUND

Digital printing is a printing technique commonly used in the printing industry, as it allows for on-demand printing, short turn-around, and even a modification of the image (variable data) with each impression. Some of the techniques developed for printing on a surface of a three-dimensional object are described hereinbelow.

Known processes for printing patterns onto surfaces typically include stacking of pigmented layers, one on top of the other, to form the desired patterns. A typical printing process requires printing of a first pigmented layer, followed by at least partial curing or pinning (typically by UV light or heating to evaporate solvents from the ink formulation and/or to cure the pigment formulation). A second pigmented layer is printed on top of the first pigmented layer and then at least partially cured. This process is repeated as required in order to obtain the desired pattern.

In another known printing process, the printing system includes a plurality of printing heads and a plurality of curing means (for example, light sources) that move concomitantly one with the other. Namely, the curing means is arranged in proximity to the printing head and moves therewith, such that each drop of ink is cured immediately after printing.

These printing processes exhibit several major drawbacks. The printing techniques known in the art are typically carried out by stacking various printed layers. In order to permit such stacking, the layers are printed in a sequential manner, while curing each layer prior to application of the next layer. This, although preventing colors from mixing with one another, also results in relatively long printing processes. Further, sequential printing and curing is highly prone to pattern defects, as slight misalignments between the printed layers may result in undesired overlap of layers or mixing of colors, while insufficient curing between printing cycles often causes blurring of the printed image, thereby reducing the overall resolution of the printed pattern.

The shortcomings of the common printing techniques are of even greater significance when printing a pattern onto a curved surface; as such requires a high level of spatial accuracy and alignment of printed layers.

Classical printing techniques (i.e. in which each color is separately printed and cured) typically require exposing the surface to several actinic light sources—a light source per each color. These light sources should be positioned in proximity to the print-heads, an arrangement which at times causes reflectance and dispersion of the actinic light resulting in undesired curing of the color formulation within and in the vicinity of the print-head nozzles, causing blocking of the nozzles. Such setups are also typically voluminous, as each printed color requires a complete application system (print-head and pinning/curing system).

Other common printing techniques involve using UV masks directly printed on top of photo-polymeric materials. However, due to the limited viscosity of typical ink formulations applicable to ink-jet technologies, high print quality of the image cannot be achieved and problems such as bleeding, strike-through, clustering or feathering of the ink droplets have been observed.

At times, a primer layer or a pre-coat formulation is applied onto the surface in order to prepare the surface for printing of color formulations. However, typically such primers or pre-coats are tailored specifically for a given surface, and cannot be applied to surfaces of various properties, geometries and roughness levels.

In addition, most of the primer compositions known in the art require a process of curing prior to the application of other layers, thereby increasing the complexity of the printing process and required equipment.

General Description

Unlike traditional ink-jet printing, the present invention allows high accuracy ink-jet printing, high resolution and optical density, as well as minimization of curing cycles for fixation of the pattern onto a surface, all of which obtained by a unique wet-on-wet (or wet-on-semi wet) printing method. The printing formulations and methods of the invention are suitable for printing high quality patterns also onto curved surfaces, where traditional printing formulations fail to provide high accuracy printing and high resolution patterns.

It will be understood that the following aspects of the invention (e.g. pre-coat formulations, patterning formulations, patterning methods, etc.), may each be used in a suitable printing system or process. Although the aspects and principles of the present invention will be individually described, it is appreciated that one or more aspects and principles disclosed herein may be combined or concomitantly used in a suitable system or printing process, and such combinations are also contemplated within the scope of this disclosure.

Pre-Coat Formulations

Unlike traditional ink-jet printing, the pre-coat formulations of the present disclosure allow preparing various surfaces for printing, without the need to tailor the formulation to the type of the surface and its physical and/or chemical properties. Further, due to its unique properties, as will be explained herein, the pre-coat formulation of the present disclosure enables printing onto 3D (curved) surfaces, as well as enhanced fixation of various patterning formulations applied thereon. Thus, formulations of this disclosure ultimately provide high accuracy ink-jet printing, high resolution and optical density, as well as minimization of curing cycles for fixation of the pattern onto a surface.

Thus, in one of its aspects, the present disclosure provides a printing pre-coat formulation comprising at least one functionalized monomer, at least one oligomer, at least one surfactant, at least one first photo-initiator activatable by a first wavelength, and at least one second photo-initiator activatable by a second wavelength.

The term (printing) pre-coat formulation, is meant to encompass a multi-component composition of matter, used as a primer or a coating composition, to be applied directly on a surface on which printing is desired. Once the pre-coat formulation is applied, it forms a pre-coat layer on the surface, onto which other (subsequent) printing formulations may be applied by any suitable technique (for example ink jet printing). The pre-coat formulation is typically liquid, and may be in the form of a homogenous solution (i.e. in which each components is soluble in the other components of the formulation), or in the form of a dispersion or suspension, in which some components of the pre-coat formulation are dispersed or suspended in other components of the formulation.

The pre-coat formulation may be characterized, in some embodiments, by a surface tension of at most 37 mN/m. The surface tension values are provided for ambient conditions, which, unless otherwise and specifically noted, will refer to atmospheric pressure and a temperature of 25° C.

As typical surfaces onto which printing is desired have surface tensions of at least 35 mN/m, at times above 100 or even 500 mN/m, the lower surface tension of the pre-coat formulation provides for adequate wetting of the surface, as well as even spreading of the pre-coat formulation onto the surface.

In some embodiments, the pre-coat formulation may have a surface tension of between about 20 and about 37 mN/m, between about 20 mN/m and 36 mN/m, between about 20 mN/m and 25 mN/m, or even between about 20 mN/m and 33 mN/m.

The pre-coat formulation comprises several components, tailored together to provide a desired property of the pre-coat formulation.

The pre-coat formulation comprises at least one functionalized monomer and at least one oligomer. The monomers and oligomers are selected such that they can be co-polymerized, assisted by a photo-initiator as will be explained below, to form the layer of pre-coat onto the surface. The term monomer refers to a molecule that can chemically react with identical or similar molecules to form a polymeric chain. Namely, the monomer is a basic building block that can be considered as the repeating basic unit of a polymer chain. Similarly, the term oligomer refers to a polymer repeating unit comprising several monomers, e.g. between 2 and 20 monomers.

According to some embodiments, the at least one monomer may be selected from methylacrylate (MA), methylmethacrylate (MMA), ethylacrylate, (ethylhexyl)acrylate, hydroxyethyl methacrylate, butylacrylate, butylmethacrylate, trimethylolpropane triacrylate (TMPTA), tri-ethoxy triacrylate (TMP(EO)3TA), isobornyl acrylate (IBOA), dipropylene glycol diacrylate (DPGDA) and combinations thereof.

The at least one monomer, by some embodiments, may be present in the pre-coat formulation in a concentration of between about 15 to about 70 wt %. In other embodiments, the monomer is present in the formulation at a concentration of between about 20 and 70 wt %, between about 25 and 70 wt %, between about 30 and 70 wt %, between about 35 and 70 wt %, or even between about 40 and 70 wt %. In some other embodiments, the monomer may be present in the formulation at a concentration of between about 15 and 65 wt %, between about 15 and 60 wt %, between about 15 and 55 wt %, between about 15 and 50 wt %, or even between about 15 and 45 wt %. In additional embodiments, the concentration of the monomer in the formulation may be between about 30 and 65 wt %, between about 30 and 60 wt %, or even between about 35 and 60 wt %.

According to other embodiments, the oligomer may be selected from epoxy acrylates, polyester acrylate, acrylic acrylate, urethane acrylate, and combinations thereof.

The at least one oligomer may, according to some embodiments, be present in the pre-coat formulation in a concentration of between about 5 and 50 wt %. In other embodiments, the oligomer is present in the pre-coat formulation at a concentration of between about 10 and 50 wt %, between about 15 and 50 wt %, between about 20 and 50 wt %, between about 25 and 50 wt %, or even between about 30 and 50 wt %. In some other embodiments, the oligomer may be present in the pre-coat formulation at a concentration of between about 5 and 45 wt %, between about 5 and 40 wt %, between about 5 and 35 wt %, or even between about 5 and 30 wt %. In additional embodiments, the concentration of the oligomer in the pre-coat formulation may be between about 10 and 45 wt %, between about 15 and 35 wt %, or even between about 15 and 30 wt %.

The monomer is functionalized by at least one reactive group. The oligomer may or may not be functionalized by at least one functional group, being the same or different from that of the functionalized monomer. The term reactive group refers to a functionalizing group that is attached, typically grafted, to the monomer or to the oligomer backbone, and is capable of chemical reaction with a suitable complementary reactive group. In pre-coat formulations of the invention, the reactive group is generally unaffected by the polymerization processes of the monomers and oligomers, and is maintained chemically reactive to suitable complementary groups.

The complementary reactive groups are suitable functional groups present in one or more patterning formulations (to be described below) to be applied onto the pre-coat layer in the subsequent printing process. Thus, a chemical reaction that occurs between the reactive groups of the pre-coat formulation and the complementary reactive groups present in the patterning formulations applied onto the pre-coat afford for fixation of the patterning formulations onto, and at times into, the pre-coat layer.

The chemical reaction may be any reaction known in the art, for example, an acid-base reaction, a redox reaction, ionic bonding, complexation, etc. In some embodiments, the reactive group is an acidic moiety while the complementary reactive group is a base moiety. In other embodiments, the reactive group is a base moiety while the complementary reactive group is an acidic moiety.

When the reactive group is acidic, it may, by some embodiments, be selected from carboxyl groups, sulfonic acid groups ($-SO_2OH$), thiols, and enols. The complementary reactive group, in such embodiments, will be basic.

In other embodiments, wherein the reactive group is basic (i.e. reacting as a base), it may be selected from primary amines, secondary amines, tertiary amines, hydroxyl groups, amides and the like. The complementary reactive group, in such embodiments, will be acidic.

In some embodiments, the pre-coat formulation may comprise at least one other oligomer, which may or may not be functionalized. Such at least one other oligomer may have the same or different backbone of said at least one oligomer. Namely the backbone of said at least one oligomer (i.e. without the functionalizing groups, if present) may be the same or different from the at least one other oligomer. In some embodiments, the at least one other oligomer may be independently selected from epoxy acrylates, polyester acrylate, acrylic acrylate, urethane acrylate, and combinations thereof.

In some embodiments, the at least one other oligomer may be present in the pre-coat formulation in a concentration of between about 5 and 15 wt %.

In some embodiments, the at least one oligomer and the at least one other oligomer are both non-functionalized. In other embodiments, at least one of said at least one oligomer and said at least one other oligomer is functionalized.

In some other embodiments, both of said at least one oligomer and said at least one other oligomer are functionalized. In such embodiments, the functionality of the oligomers may be the same or different (i.e. acidic or basic); the at least one oligomer may carry the same functional groups or different functional groups from that of the at least one other oligomer.

The pre-coat formulation also comprises at least one surfactant. In the context of the present disclosure, the term surfactant is meant to encompass chemical agents that modify, typically reduce, the surface tension of the formulation. The surfactants provide the formulation with the desired surface tension, for example a surface tension of at most 37 mN/m, such that sufficient wetting and spreading of the pre-coat formulation is obtained once applied onto the surface to be printed. Without wishing to be bound by theory, the surfactant molecule comprises a polar moiety and non-polar moiety. In pre-coat formulations of this disclosure, which may be based on polar acrylic monomers and oligomers, the surfactant molecules will have a tendency to accumulate close to the outer surface of the pre-coat formulation, i.e. at the pre-coat interface with the surface and/or air, thus modifying the surface tension of the formulation at the interface areas.

Pre-coat formulations of this disclosure may comprise more than one surfactant, such that each surfactant has a different impact on the formulation's surface tension. Namely, it is contemplated within the scope of the present disclosure that due to polarity and/or molecular weight differences, one surfactant will accumulate in the formulation/air interface, while another will accumulate in the formulation/surface interface, thereby causing different surface tension modification at each of the interfaces.

In some embodiments, the at least one surfactant is selected from a siliconic polymer, a silico-organic polymer, acrylate modified siloxanes, fluoroacrylate modified siloxanes, and other suitable surfactants, as well as mixtures or combinations thereof.

In other embodiments, the at least one surfactant is present in said pre-coat formulation in a concentration of between about 0.01 and 4 wt %. According to other embodiments, the surfactant is present in the pre-coat formulation at a concentration of between about 0.01 and 3.8 wt %, between about 0.01 and 3.6 wt %, between about 0.01 and 3.4 wt %, between about 0.01 and 3.2 wt %, between about 0.01 and 3 wt %, between about 0.01 and 2.8 wt %, between about 0.01 and 2.6 wt %, between about 0.01 and 2.4 wt %, between about 0.01 and 2.2 wt %, or even between about 0.01 and 2 wt %. According to some other embodiments, the surfactant may be present in the pre-coat formulation at a concentration of between about 0.02 and 4 wt %, between about 0.03 and 4 wt %, between about 0.03 and 4 wt %, between about 0.04 and 4 wt %, or even between about 0.05 and 4 wt %. According to additional embodiments, the concentration of the surfactant in the pre-coat formulation may be between about 0.02 and 3.8 wt %, between about 0.03 and 3.6 wt %, between about 0.04 and 3.4 wt %, or even between about 0.05 and 3 wt %.

As noted above, the monomers (and at times also the oligomers) are selected such that their polymerization may be obtained at desired conditions during the printing process. For this purpose the pre-coat formulation comprises at least 2 photo-initiators, each being activatable by irradiation at a different wavelength. Thus, in a pre-coat formulation of this disclosure, each of the photo-initiators may be activatable at a desired distinct time by controlling the irradiation to which the pre-coat formulation is exposed to. A photo-initiator is typically a chemical compound used for increasing the rate of one or more steps in the polymerization (also known as curing) mechanism by providing a reaction path having lower activation energy, e.g. by formation of radical species to promote polymerization by an addition mechanism.

Exemplary, non-limiting, photo-initiators are aromatic ketones, organic phosphines, benzyl peroxide, benzophenone, etc, such as piperazin-based aminoalkylphenone (Omnipol 910), di-ester of carboxymethoxy thioxanthone and polytetramethyleneglycol (Omnipol TX), bis(2,4,6-trimethylbenzoyl)phenylphosphine oxide (irgacure 819) or 4-hydroxylbenzophenone laurate (Omnirad 4HBL), as well as polymeric photo-initiators.

The first photo-initiator is activatable at irradiation by a light in a first wavelength. In some embodiments, the first wavelength may be between about 365 nm and about 470 nm.

In pre-coat formulations of this disclosure, the first photo-initiator is used for increasing the viscosity of the pre-coat formulation once applied onto the surface, however, without obtaining full polymerization of the monomers and the oligomers, rendering the surface of the pre-coat formulation sticky to enable application of other formulations, e.g. patterning formulations, thereonto. For this purpose, the concentration of the first photo-initiator in the pre-coat formulation is typically low, and insufficient to enable complete polymerization of the monomers and the oligomers, thereby ensuring its relatively fast depletion (or poisoning) upon said exposure to the first irradiation wavelength. Thus, in some embodiments, the at least one first photo-initiator is present in the pre-coat formulation in a concentration of between about 0.1 and 2 wt %. In other embodiments, the first photo-initiator is present in the pre-coat formulation at a concentration of between about 0.1 and 1.8 wt %, between about 0.1 and 1.6 wt %, between about 0.1 and 1.4 wt %, between about 0.1 and 1.2 wt %, or even between about 0.1 and 1 wt %. In some other embodiments, the first photo-initiator may be present in the pre-coat formulation at a concentration of between about 0.2 and 2 wt %, between about 0.25 and 2 wt %, between about 0.3 and 2 wt %, between about 0.35 and 2 wt %, between about 0.4 and 2 wt %, or even between about 0.45 and 2 wt %. In additional embodiments, the concentration of the first photo-initiator in the pre-coat formulation may be between about 0.15 and 1.8 wt %, between about 0.2 and 1.6 wt %, between about 0.3 and 1.4 wt %, between about 0.4 and 1.2 wt %, or even between about 0.5 and 1 wt %.

In some embodiments, the pre-coat formulation's viscosity is at least 25 cps (centipoises) at ambient temperature. Thus, when the at least one first photo-initiator is activatable by exposure to the first wavelength, it is capable, in some embodiments, to cause an increase of the viscosity of the pre-coat formulation to at least 100 cps, at least 1,000 cps, at least 10,000 cps or at least 100,000 cps.

The term viscosity is meant to denote the resistance of a formulation or a printed layer to gradual deformation by applied stress. As the formulations of this disclosure are typically in liquid form, an increase in viscosity will typically be observed as semi-solidification and/or gelling of the formulation; i.e. when the formulation's viscosity is increased, the layer becomes more resistant to applied stresses. Such semi-solidification permits sufficient fixation of the pre-coat formulation onto the surface on the one hand, and the ability to apply patterning formulations onto the pre-coat layer without awaiting full polymerization (or drying) thereof on the other hand. Namely, the partial polymerization affords the application and fixation of patterning formulations onto the pre-coat layer without requiring curing/drying steps in between such applications, enabling a so-called wet-on-wet printing, as will be also described herein.

Namely, the first photo-initiator functions in the pre-coat formulation to partially cure the pre-coat formulation once exposed to a suitable light source, thereby causing an increase in the viscosity of the formulation in the printed pre-coat layer.

As exposure to the first wavelength causes only partial curing of the pre-coat layer (typically accompanied by viscosity increase), final fixation of the printed pattern is obtained only after completion of its printing. At least a second photo-initiator, as noted above being distinct from said first photo-initiator, is used to enable substantially full polymerization of the monomers and optionally the oligomers. Such full polymerization is used to solidify (i.e. further increase the viscosity) and permanently fix the printed pattern once all desired patterning formulations have been applied onto (and at times into) the pre-coat layer.

The second photo-initiator is activatable at a distinct second wavelength, sufficiently different from the activation wavelength of the first photo-initiator. In some embodiments, the second wavelength is between about 200 nm and about 470 nm.

Non-limiting examples of second photo-initiators are 1-[4-(2-hydroxyethoxy)-phenyl]-2-hydroxy-2-methylpropanone (Omnirad 659), 1-hydroxy-cyclohexyl-phenylketone (Omnirad 481), hydroxyketone (esacure Kip 160), methyl-o-benzoylbenzoate (Omnirad OMBB), 4-(4-methylphenylthio)benzophenone (Speedcure BMS), 2-benzyl-2-(dimethylamino)-4'-morpholinobutyrophenone (Omnirad 248), as well as polymeric photo-initiators.

According to other embodiments, the at least one second photo-initiator is present in said pre-coat formulation in a concentration of between about 3 and 10 wt %, being a quantity ensuring substantially full polymerization of the monomers and optionally the oligomers upon exposure to irradiation at said second wavelength. In some embodiments, the second photo-initiator is present in the pre-coat formulation at a concentration of between about 3 and 9.5 wt %, between about 3 and 9 wt %, between about 3 and 8.5 wt %, between about 3 and 8 wt %, or even between about 3 and 7 wt %. In other embodiments, the second photo-initiator may be present in the pre-coat formulation at a concentration of between about 3.5 and 10 wt %, between about 4 and 10 wt %, between about 4.5 and 10 wt %, or even between about 5 and 10 wt %.

Each of the first and second photo-initiators may be, independently of the other, constituted by a single compound or a mixture of compounds.

It is also of note that the first and second photo-initiators may be constituted by the same chemical molecule. In such cases, the photo-initiator molecule will contain 2 distinct moieties, a first of which being activatable by said first wavelength and the other being activatable by said second wavelength. In such cases, the first photo-initiator is not consumed completely upon exposure to irradiation in the first wavelength, but rather is rendered inactive when the formulation is exposed to irradiation in said second wavelength.

In the context of the present disclosure, the term wavelength denotes a radiation band, i.e. irradiation in a band of wavelengths, which may broad or narrow (depending on the irradiation source used). The term is also meant to encompass monochromatic radiation at a defined (single) wavelength.

It is further of note that, at times, the first and second photo-initiators may be activatable at the same wavelength, however, requiring different intensities and/or different irradiation time for activation. It is also of note that the pre-coat formulation may be irradiated by a single light source, however, each of the photo-initiators in the formulation will react to a different wavelength of the light source. In some embodiments, the first and second photo-initiators are each activatable by a different combination of wavelength, irradiation intensity and irradiation time period (i.e. at least one of the wavelength, intensity and time period may be different).

The pre-coat formulation may, by some embodiments, comprise nanoparticles, typically having an average diameter of between about 5 and about 500 nanometers. In some embodiments, the nanoparticles have an average diameter of between about 5 and about 450 nm, between about 5 and about 400 nm, between about 5 and about 350 nm, between about 5 and about 300 nm, or even between about 5 and about 250 nm. In other embodiments, the nanoparticles may have an average diameter of between about 10 and about 500 nm, between about 20 and about 500 nm, between about 25 and about 500 nm, between about 30 and about 500 nm, between about 35 and about 500 nm, between about 40 and about 500 nm, or even between about 45 and about 500 nm. In some other embodiments, the nanoparticles may have an average diameter of between about 10 and 450 nm, between about 20 and about 350 nm, between about 25 and about 250 nm, or even between about 30 and about 200 nm.

According to some embodiments, the nanoparticles may have an average diameter of no more than 250 nm.

The nanoparticles are typically selected according to their absorbance, as to not hinder the optical properties of the pre-coat formulations (e.g. the formulation's transparency). Thus, in some embodiments, the nanoparticles are transparent to irradiation in the visible spectrum, i.e. to wavelengths of between 400 and 700 nm. Any such suitable nanoparticle may be used in the pre-coat formulation; in some embodiments, the nanoparticles are silica nanoparticles ($SiO_2$).

The pre-coat formulation may further comprise, in some embodiments, at least one of a pigment, a diluent, a polymer, an adhesion modifier, a free-radical scavenger, a viscosity modifier, or any other functional additive.

The term pigment refers to a chemical agent rendering the pre-coat formulation with a desired color or other desired property. It is of note that the pigment is selected such that it does not absorb irradiation of light in the aforesaid first and second wavelengths, as to not to hinder the desired activity of the photo-initiators. In some embodiments, the pigment is selected from a chromophore, a salt, an encapsulated pigment powder, thermochromic pigments, fluorescent pigments, security tagging agents, inorganic pigments, organic pigments, etc. The term also encompasses metallic particles, magnetic particles, conductive pigments, glass or ceramic particles (frit), luminescent pigments, etc.

In other embodiments, the pre-coat formulation is transparent (at least in visible light wavelengths).

The diluent is an agent permitting control of the pre-coat formulation's initial viscosity. In some embodiments, the diluent may be selected from at least one optionally substituted aliphatic diluent, at least one optionally substituted aromatic diluent, an acrylic acid ester, and mixtures thereof.

In other embodiments, the diluent may be an acrylic acid ester monomer, which may take part in the polymerization process activated by either the first and/or second photo-initiators. When present, the diluent may constitute 25-30 wt % of the pre-coat formulation.

It is of note that in the context of the present disclosure the diluent should not be confused with a solvent. Although used to reduce the initial viscosity of the formulation, the diluent is not evaporated, and increase of viscosity once the photo-initiators are activated is caused by polymerization and not evaporation of volatile components (such as solvents). Thus, in some embodiments, the pre-coat formulation is substantially devoid of solvents, e.g. volatile solvents. As one or more of the components used to formulate the pre-coat formulation may be in the form of a solution, namely comprising a native solvent that is used to dissolve therein a specific component, the term substantially devoid of solvents means to denote a concentration of solvent that does not have a significant effect on the properties of the pre-coat formulation and/or the printed pattern (e.g. viscosity, surface tension, tackiness, curing profile, etc.). In some embodiments, the pre-coat formulation may comprise trace amounts of solvents, i.e. impurities of solvents that originate from the components used to formulate the pre-coat formulation.

According to some embodiments, the pre-coat formulation may comprise up to 5 wt % of solvent. According to other embodiments, the pre-coat formulation may comprise between 0 and 4.5 wt % solvent, between 0 and 4 wt % solvent, between 0 and 3.5 wt % solvent, between 0 and 3 wt % solvent, or even between 0 and 2.5 wt % solvent. According to some other embodiments, the pre-coat formulation may comprise between 0.01 and 5 wt % solvent, between 0.05 and 5 wt % solvent, between 0.1 and 5 wt % solvent, between 0.2 and 5 wt % solvent, or even between 0.5 and 5 wt % solvent.

In some embodiments, the pre-coat may be applied onto the surface in advance; in other embodiments, the pre-coat formulation may be applied onto the surface immediately prior to application of any of the patterning formulations.

Thus, in another one of its aspects, this disclosure provides a substrate for printing comprising a surface, being pre-coated on at least a portion of the surface by a layer of pre-coat formulation as described herein. Namely, one of the products encompassed by the present invention is a substrate onto which a pre-coat formulation of the invention was applied, rendering the substrate suitable for printing (i.e. application of printing and/or patterning formulations) by various printing techniques, e.g. jet printing.

The surface may be of any material. The surface may be the whole surface or any portion thereof. The portion of the substrate surface to be coated may be of any size and structure, the portion may be continuous or comprise of several non-continuous spaced apart sub-portions. In some embodiments, the surface of the substrate is substantially two-dimensional. In other embodiments, the surface is that of a three-dimensional object. In other embodiments, the at least one portion of the substrate (or object's) surface is its whole surface.

The coating may be carried out on any suitable substrate, which may be a flexible or rigid substrate, absorbing or non-absorbing, conductive or nonconductive, colored or transparent, may be substantially two-dimensional (a thin flat substrate), a three-dimensional curved (non-flat) surface, an un-even or non-homogenous surface, etc. The surface can be of any smoothness. In most general terms, the substrate may be of a solid material such as metal, glass, paper, a semiconductor, a polymeric material, a ceramic surface, or even a hybrid substrate containing several different materials. The surface material, being the substrate on which the pre-coat formulation is applied, may not necessarily be of the same material as the bulk of the substrate. For example, the substrate may comprise an outer layer, which is different from the bulk material, onto which the pre-coat formulation of this disclosure is applied. A non-limiting example of such substrates may be painted substrates or glazed substrates.

The substrate may have a uniform surface, i.e. of substantially uniform surface roughness, made of a single material (or a single composition), and/or have a uniform thickness. However, it is of note that in the context of the present disclosure, the surface may be non-uniform. Namely, the surface of the substrate may include at least 2 sections, differing in at least one of roughness, height, thickness, material or composition, etc. The at least 2 sections may be integral one with the other or have gaps between them (i.e. the substrate sections may be continuously-associated). For example, one of the substrate sections may be a tube while the other substrate section can be a cap to be associated with the tube, such that a small gap is formed between the tube and the cap. Thus, methods of this disclosure may be applied as continuous printing onto multi-sectioned substrates.

Thus, in some embodiments, methods of this disclosure comprise continuously patterning the pre-coat formulation onto a surface of a substrate comprising at least 2 continuously-associated sections. As a man of the art would appreciate, each of the sections may be patterned to form a plurality of regions, each patterned region differing from the other by at least one of a chemical and a physical property.

In some embodiments, the pre-coat formulation is substantially depleted from the first activatable photo-initiator once exposed to irradiation of said first wavelength. According to such embodiments, the viscosity of the formulation is at least 100 cps, at least 1,000 cps, at least 10,000 cps or at least 100,000 cps. The increased viscosity is of specific importance when preparing 3D surfaces for subsequent printing, thereby preventing running or oozing of the pre-coat formulation due to the curvature of the surface.

Such substrates may further comprise a removable layer, positioned on top of the pre-coat formulation layer, which serves as a protecting layer. The protecting layer may be removed by the user or the printing system prior to subsequent printing.

The pre-coat formulation of this disclosure may also function as a curing-promoter for patterning formulations that are difficult to cure under standard curing conditions (such as exposure to a UV radiation source). Such patterning formulations are often highly-loaded with pigment, such that the pigment absorbs part of the radiation and hinders proper curing. Without wishing to be bound by theory, once the patterning formulations are applied onto the pre-coat formulation, a part of the photo-initiators present in the pre-coat formulation may diffuse or migrate into the patterning formulation, thereby increasing the concentration of photo-initiators in the patterning formulation and promoting its curing.

Thus, in another aspect, the disclosure provides a pre-coat formulation as described herein for use in promoting curing in a patterning formulation applied thereonto.

Pre-coat formulations of this disclosure also exhibit abrasion resistance and high adhesion to various surfaces onto which they are applied; consequently rendering the entire pattern printed onto the surface with exceptional stability and adhesivity. Thus, in another aspect, the disclosure provides a pre-coat formulation as described herein for use in increasing adhesion of a patterning formulation applied thereonto to a surface.

In another aspect, the invention provides a method of preparing a surface for printing, comprising:
(a) applying a pre-coat formulation as described herein onto at least a portion of the surface; and
(b) exposing the surface to irradiation at a first wavelength to activate at least one first photo-initiator in the pre-coat formulation, such that the viscosity of the formulation increases by at least an order of magnitude compared to its initial viscosity, to obtain a pre-coated surface.

In the present context, at least an order of magnitude refers to increase of an initial value by at least 10-folds, at least 100-folds, at least 1,000-folds or even at least 10,000-folds. Namely, the initial viscosity of the pre-coat formulation will increase by at least a factor of 10 due to exposure to irradiation in the first wavelength.

In some embodiments, the method further comprises applying a removable layer onto the viscosified pre-coat layer.

In one other aspect, the invention provides a method for printing a pattern onto a substrate, comprising:
(a) applying a pre-coat formulation as described herein onto at least a portion of the substrate's surface;
(b) exposing the surface to irradiation at a first wavelength to activate at least one first photo-initiator in the pre-coat formulation;
(c) applying at least one patterning formulation onto at least a region of said portion; and
(d) exposing said surface to irradiation at a second wavelength to activate at least one second photo-initiator in the pre-coat formulation.

In another aspect, the invention provides a method for printing a pattern onto a substrate, comprising:
(a) applying a pre-coat formulation as herein described onto at least a portion of the substrate's surface;
(b) exposing the surface to irradiation at a first wavelength to activate at least one first photo-initiator in the pre-coat formulation;
(c) applying at least one patterning formulation onto at least a region of said portion, such that said at least one patterning formulation comprising a complementary reactive group being capable of chemically reacting with a reactive group in said pre-coat formulation; and
(d) exposing said surface to irradiation at a second wavelength to activate at least one second photo-initiator in the pre-coat formulation.

During printing, the pre-coat formulation is first applied onto a surface by any suitable technique known per-se. Non-limiting examples of pre-coat formulation application techniques include ink-jet printing, spraying, painting, pasting, etc.

Once applied onto the surface, the pre-coat formulation is exposed to irradiation in said first wavelength, thereby causing an increase in viscosity due to limited polymerization of the pre-coat formulation. In some embodiments, the initial viscosity of the pre-coat formulation is increased by at least an order of magnitude by said exposure to irradiation at said first wavelength. According to such embodiments, the pre-coat formulation has a viscosity of at least 10 cps, at times at least 25 cps or even at least 40 cps before exposure to said irradiation, and a viscosity of at least 1,000 cps after such exposure. In some embodiments, the pre-coat formulation may have a viscosity of between about 10 and 300 cps before exposure to said irradiation, and a viscosity of at least 1,000 cps after such exposure.

Then, drops or spots of at least one patterning formulation are applied, to thereby obtain a desired pattern. While the pre-coat formulation is often clear or transparent, the patterning formulation(s) comprise pigments. When applying 2 or more patterning formulations, each patterning formulation may comprise a different pigment. For example, at least 4 patterning formulations, each of which comprising a different pigment, for example selected from cyan, magenta, yellow and black (or key), also known as CMYK colors, may be applied onto the viscosified pre-coat layer in order to form a desired printed pattern. Other patterning formulations may be such that comprise a white pigment, metallic particles, conductive pigments, texturing agents, thermochromic pigments, fluorescent pigments, security tagging agents, magnetic particles, glass or ceramic particles (frit), etc.

The term pattern refers to any shape, of any size, formed onto the surface by applying one or more of the patterning formulations onto said surface regions. For example, the pattern may be a single geometrical or abstract shape. Alternatively, the pattern may comprise a plurality of shapes, being of identical or different size, distributed in a random or ordered manner on the surface. The term also encompasses lines, letters, numerals, symbols, etc.

In some embodiments, the at least one patterning formulation has a surface tension larger by at least 3 mN/m compared to the surface tension of the pre-coat formulation. Without wishing to be bound by theory, the difference between the surface tensions prevents bleeding or feathering of one patterning formulation into another patterning formulation, as wetting and spreading of the patterning formulations onto the pre-coat layer is limited by the differences in surface tensions. Thus, high patterning resolution and defined (sharp) border-lines may be obtained between different patterning formulations, as well as prevention of undesired mixing of colors.

As noted above, the pre-coat formulation enables obtaining further fixation by a chemical reaction, e.g. an acid-base reaction, between a reactive group in the pre-coat formulation and a complementary reactive group in the patterning formulation(s). In some embodiments, said reactive group is an acidic functional group and said complementary reactive group is a basic functional group. In other embodiments, said reactive group is a basic functional group and said complementary reactive group is an acidic functional group.

The pre-coat formulation also enables controlling the depth of embedding of a patterning formulation drop within the pre-coat layer. This may be obtained by selectively controlling one of the properties of the pre-coat layer, e.g. the thickness of the pre-coat layer, at different regions of the surface, as will be now explained.

In some embodiments, the pre-coat formulation is selectively applied onto a plurality of surface portions, such that at least one of said portions being coated by pre-coat of a first thickness and at least one other of said portions being coated by pre-coat of a second thickness, said second thickness being larger than said first thickness. Once partially viscosified by exposure to irradiation in said first wavelength, a drop of patterning formulation applied onto said first thickness portions is at least partially embedded within said pre-coat, and a drop of patterning formulation applied onto said second thickness portions is at least partially maintained on top of the pre-coat.

The term selectively applying is meant to encompass a controllable application of the pre-coat formulation in order to obtain the desired first and second portions. The application of the pre-coat may be carried out by selective application of pre-coat formulation drops onto each first and second selected portions, in order to obtain the desired thickness of pre-coat at each portion. Alternatively, the first and second portions may be formed by first applying the pre-coat formulation on the entire surface to form a pre-coat layer of a first thickness, followed by selective application of the pre-coat formulation onto desired portions, to thereby form portions of a second thickness.

The first and second portions may be obtained, by other embodiments, by selective application of different pre-coat formulations of this disclosure. Namely, the first portions may be formed by applying a first pre-coat formulation, while the second portions may be formed by applying a second pre-coat formulation. The first and second pre-coat formulations (both being formulations as described herein) may differ in at least one of their chemical composition, viscosity, surface tension, chemical reactivity or any other parameter. The first and second pre-coat formulations may be selectively applied onto pre-defined first and second portions; alternatively, one pre-coat formulation may be uniformly applied onto the surface, and the other selectively applied thereonto, thereby obtaining said first and second portions.

In some embodiments, at least two pre-coat formulations may be applied to each portion of the surface as to obtain a defined ratio between the pre-coat formulations in said portion.

When two or more pre-coat formulations are applied to the same surface portion, at least one of the pre-coat formulations need not to include all of the formulation's components. Namely, at least one of the pre-coat formulations may include only some of the components of the pre-coat formulation, such that once a mixture of pre-coat formulations is obtained at said surface portion, the mixture includes all of the necessary components enabling the functionality of the pre-coat layer at said region. By way of example, when printing two pre-coat formulations onto the same surface portion, one of the formulations may comprise a surfactant, while the other may be devoid of surfactant. When the formulations are printed onto the same surface portion, their mixture may result in the desired surfactant content for enabling the desired functionality at that surface portion.

When more than one pre-coat formulation is used, the pre-coat formulations may be applied onto the surface by sequential or concomitant printing using the same printing nozzle. Alternatively, each of the formulations may be printed from a dedicated nozzle, the nozzles being adjacent one another in the printing system. By another embodiment, in any given portion of the surface, a first pre-coat formulation may be applied to form a first sub-layer and a second, different, pre-coat formulation may then be applied thereonto to form a second sub-layer. In such embodiments, the pre-coat layer will actually consist of a plurality (at least two) of such sub-layers, thereby forming a per-coating multilayer in said portion. Different portions on the surface may vary in the composition of such pre-coat multilayers. Namely, in a given multilayered portion, the thickness ratio between the first and second pre-coat sub-layers may vary in the range of between 0:100% and 100%:0. For example, in one portion the a sub-layer of the first pre-coat formulation may occupy 40% of the thickness of the multilayer, while the second sub-layer of pre-coat formulation may occupy the remaining 60% of said multilayer; while in an adjacent portion, the first pre-coat sub-layer may occupy 50% of the thickness of the multilayer, while the second pre-coat sub-layer may occupy the remaining 50% of said multilayer.

In another such embodiment, the ratio between the first and second per-coat formulations may differ at various points within a single surface portion. For example, a first pre-coat formulation may be applied on a surface portion in a first sub-layer having a gradually increasing (or gradually decreasing) thickness, and a second sub-layer of a second, different, pre-coat formulation may be applied onto the first sub-layer to have a complementary gradually changing profile. In other words, where the first sub-layer has a gradually decreasing thickness along a lateral direction in the portion, the second sub-layer has a complementary gradually increasing thickness along the same lateral direction, such that the multilayer eventually formed has an upper surface being substantially parallel to the substrate. In such a multilayer arrangement, the ratio between the first and second pre-coat formulation will range between 100%:0 and 0:100% at any point along the lateral direction.

As a person of the art would appreciate, as in such an arrangement the pre-coat sub-layers are printed one on top of the other while the formulations are still in their substantially uncured state, an interface region may form between the sub-layers. In such an interface region, mixtures of the first and second pre-coat formulations at any given ratio between 100%:0 and 0:100% may form.

The first portions and second portions may be of any desired shape or contour.

The first and second portions may differ in their thickness; namely, the second portion may have a thickness larger than the first portion. The thickness of the pre-coat in each portion may determine the behavior of a droplet of patterning formulation applied thereon, as explained herein.

In some embodiments, the pre-coat formulation is applied onto the surface to form a plurality of spaced-apart first portions of first thickness and/or a first pre-coat formulation, and a plurality of spaced-apart second portions of second thickness and/or a second pre-coat formulations.

In other embodiments, the first and second portions are alternately arranged on the surface. In some other embodiments, the first and second portions each form an ordered array of portions.

According to some embodiments, the first and second portions are integral one with the other on the surface, i.e. they are continuous, each first portion is in contact in at least one point with at least one second portion and each of the second portions is in contact with at least one first portion and at least one further portion.

Once exposed to said irradiation at a first wavelength, the different thicknesses of the pre-coat layer in the first and second and further portions allow obtaining pre-coated portions having different local curing/polymerization/viscosity degrees. It has been found that portions having larger thickness (i.e. the second portions) will show a higher degree of curing and/or higher viscosity than portions of smaller thickness (i.e. the first portions) when exposed to identical irradiation conditions.

In portions having a low thickness of the pre-coat layer (i.e. the first portions), the surface area per volume of the portion is larger than the surface area per volume of portions of greater thicknesses (i.e. the second portions and the further portions). Without wishing to be bound by theory, photo-initiators, e.g. the first photo-initiator, are typically sensitive to atmospheric oxygen and are often degraded or poisoned by exposure to oxygenation conditions. Therefore, the higher the surface per volume of the portion, the larger the extent of initiator degradation due to interaction with atmospheric oxygen, thus preventing or inhibiting polymerization in portions of higher the surface are per volume. In some embodiments, this allows obtaining a pre-coated surface characterized by first, low thickness, portions of lower degree of polymerization ("softer" portions) and second, thicker, portions of a higher degree of polymerization ("harder" portions).

After activation of the first photo-initiator, at least one patterning formulation is applied onto the pre-coated surface. As noted above, the thickness of the pre-coat at a given portion can, by some embodiments, determine the behavior of the patterning formulation applied thereon. As the first portions have a lower degree of polymerization, a droplet of patterning formulation applied thereon will penetrate the pre-coat, thereby becoming at least partially embedded, at times substantially completely embedded, within the pre-coat; while a droplet of patterning formulation applied onto the second portions, which are of a higher degree of polymerization, will remain on top of the pre-coat, without any or substantial penetration into the pre-coat.

A similar effect may be obtained by applying different pre-coat formulations onto different portions of the surface; for example, surface portions may be selectively applied with at least 2 pre-coat formulations, differing in their photo-initiators type, content or ratios, thereby providing portions with differing curing properties.

The variance between different surface portions may also be obtained by applying, in each portion, two different pre-coat formulations in varying ratios. Namely, each portion may comprise at least two different pre-coat formulations, the ratio between the formulations varying in a range between 0:100% and 100%:0, thereby controlling the position of a droplet of a patterning formulation applied thereonto.

In the context of the present disclosure, the term maintained on top (or remain on top) is meant to denote that a droplet of patterning formulation applied onto the second portion will remain on the surface of the pre-coat formulation, without substantial sinking or embedding thereinto. The term also encompasses drops of patterning formulation which are applied onto the second portions and have up to about 20% of their volume embedded within the pre-coat. Similarly, the term at least partially embedded is meant to denote that a droplet of patterning formulation applied onto the first portion will have at least about 20% of its volume embedded within the pre-coat. At times, the patterning formulation drop will be substantially fully embedded within the first portions of the pre-coat, typically having over 75% of its volume being embedded within the pre-coat.

This variance in penetration of the patterning formulation, resulting from the variance of pre-coat thickness at different portions allows printing of smooth skin tones, pigment gradation effects, and spot areas over relatively large surfaces. Such embedding may be also utilized for stacking various patterning formulations one on top of the other in a highly controllable manner.

In the harder pre-coat portions, no substantial penetration of the patterning formulation into the pre-coat occurs. This may be used, for example, to create an embossing effect, sharpness effect and fine lettering patterns.

As noted above, application of the patterning formulations is carried out in a wet-on-wet process, without the need to dry and/or cure each patterning formulation prior to applying the next one in the printing sequence. This is enabled by the unique properties of the pre-coat formulation, which promote both physical and chemical fixation of the patterning formulations during printing.

Upon completion of the pattern printing, the entire surface is exposed to irradiation in the second wavelength, thereby polymerizing the entire printed pattern at a single curing step.

Patterning

As noted above, the pre-coat formulations of this disclosure may be used to obtain a variety of patterned surfaces in a variety of patterning methods.

Thus, in another of its aspects, the present disclosure provides a method for patterning a surface, the method comprising:

patterning at least one pre-coat formulation on a surface region to form patterned regions, at least two of said patterned regions differing from each other in at least one of a chemical and a physical property;

exposing the pre-coat formulation to conditions permitting partial (i.e. limited) curing of the pre-coat formulation;

applying at least one patterning formulation onto said patterned region(s), wherein the at least one patterning formulation applied onto said patterned region interacts with the pre-coat formulation, the interaction between the patterning formulation and the pre-coat formulation being determined by said chemical and physical properties, such that (i) the patterning formulation is at least partially embedded within said pre-coat, or (ii) the patterning formulation maintained on top of the pre-coat; and exposing the surface to conditions permitting completion of curing of the pre-coat and the patterning formulations, thereby obtaining a patterned surface.

In such methods, a pre-coat formulation is first applied onto the surface of an article to be pattered, such that at least two regions of pre-coat are formed onto the surface. The two regions differ in one or more of a chemical property and a physical property. The differences in said properties determine the behavior of the droplets of patterning formulation that are applied in subsequent method steps. Namely, a patterning formulation that is applied onto the pre-coat formulation interacts (i.e. undergoes chemical and/or physical interaction) differently with the pre-coat formulation at different regions of the surface, such that (i) the patterning formulation becomes at least partially embedded within the pre-coat, or (ii) the patterning formulation is maintained on top of the pre-coat. Thus, the degree of penetration of the patterning formulation into the pre-coat is determined by the differences in at least one of a chemical property and a physical property of the pre-coat layer at different regions of the surface.

As noted above, maintained on top denotes a droplet of patterning formulation that is applied onto the second region remains on the surface of the pre-coat formulation, without substantial sinking or embedding thereinto. The term also encompasses drops of patterning formulation which are applied onto the second regions and have up to about 20% of their volume embedded within the pre-coat. Similarly, at least partially embedded is meant to denote that a droplet of patterning formulation applied onto the first region will have at least about 20% of its volume embedded within the pre-coat. At times, the patterning formulation drop will be substantially fully embedded within the first regions of the pre-coat, typically having over 75% of its volume being embedded within the pre-coat.

The terms surface, regions, pattern and substrate have the same meaning as denoted above in connection with the pre-coat formulation aspects and embodiments.

The term applying is meant to encompass application, typically controlled (or selective) application, of the pre-coat formulation in order to obtain the desired regions. The application of the pre-coat may be carried out manually or automatically. The application of the pre-coat may be carried out by selective application of pre-coat formulation drops onto each of the selected regions in order to obtain the desired physical and/or chemical property at each region. Alternatively, the regions may be formed by first applying the pre-coat formulation on the entire surface to form a pre-coat layer of a first property, followed by selective application of the pre-coat formulation onto desired regions, to thereby form regions of a different property. Alternatively, the regions of different properties may be obtained by selective application of at least two pre-coat formulations, differing in their properties.

In some embodiments, regions of different properties may be obtained by applying a layer of the pre-coat formulation and selectively exposing regions of the pre-coated surface to curing conditions, to at least partially cure the regions exposed to such conditions, thereby rendering different regions of the pre-coat with different chemical and/or physical properties.

The pre-coat formulation typically comprises at least one polymerizable component (such as monomers, oligomers or cross-linkable polymeric chains). The pre-coat may further comprise various additives, such as cross-linking agents, photo-initiators, pigments, diluent, viscosity modifiers, surface tension modifiers, fillers, surfactants, stabilizers, etc. In some embodiments, the pre-coat formation is transparent (at least to wavelengths in the visible light spectrum). In some embodiments, the pre-coat formulation is a formulation as described hereinabove in the "pre-coat formulations" chapter.

Different regions of the pre-coat layer are designed to differ in their properties. The chemical and/or physical property means to encompass any difference in same property between the regions. In other words, the same property is manifested differently in each of the two regions. By non-limiting example, the regions may differ in their thickness, viscosity, hardness (i.e. a physical property) and/or by their chemical compositions (i.e. a chemical property). In some embodiments, the regions differ in one of a chemical and physical property. In other embodiments, the regions differ in at least one of their chemical and physical properties. In some other embodiments, the regions differ in both at least one chemical property and at least one physical property.

According to some embodiments, the chemical or physical property differing between at least two of said patterned regions is at least one of composition, degree of curing, viscosity, tackiness, surface structure, surface tension, thickness of the patterned region, chemical reactivity, and pH.

In some embodiments, the chemical or physical property is the composition of the patterned regions. Namely, the surface regions of the pre-coat layer differ one from the other in their chemical composition, for example in the presence or absence of certain components, in the absolute quantities of components, in the ratios between various components, etc. Such variance may, by some embodiments, be one or more of those described above in the "pre-coat formulations" chapter.

According to some embodiments, each of the at least two patterned regions comprises at least one photo-initiator. In such embodiments, each of the at least two patterned regions may comprise a different photo-initiator. In other embodiments, each of the at least two patterned regions comprises a different amount of photo-initiator. In some other embodiments, each of the at least two patterned regions comprises a different combination of photo-initiators.

According to some embodiments, the patterned regions comprise at least two photo-initiators.

The photo-initiator is activatable by irradiation at a preselected wavelength. Thus, in pre-coat formulations that comprise more than one photo-initiator, each of the photo-initiators may be activatable at a different, often distinct, wavelength. This provides the capability of tuning the curing degree in each region, as will be further explained below.

The terms photo-initiator and wavelength are as defined hereinabove.

In some embodiments, where the pre-coat formulation comprises at least two photo-initiators, a first of said at least two photo-initiators causes said partial curing of the pre-coat formulations when exposed to irradiation in a first wavelength. In such embodiments, the first wavelength may be between about 365 nm and about 470 nm.

In other embodiments, a second of said at least two photo-initiators causes said completion of curing of the pre-coat formulation upon exposure to irradiation in a second wavelength. In such embodiments, the second wavelength may be between about 200 nm and about 470 nm.

In other embodiments, where the pre-coat formulation comprises at least two photo-initiators, both the first and the second photo-initiators cause at least partial curing of the pre-coat formulation when exposed to irradiation in the same wavelength, however each photo-initiator is activated at a different irradiation power.

It is also of note that the first and second photo-initiators may be constituted by the same chemical molecule. In such cases, the molecule will contain 2 distinct moieties, a first of which being activatable by said first wavelength and the other being activatable by said second wavelength. In such cases, the first photo-initiator is not consumed completely upon exposure to irradiation in the first wavelength, and leftovers are activated when the formulation is exposed to irradiation in said second wavelength.

The term partial curing refers to non-complete, often limited, polymerization (or non-complete curing) of the pre-coat formulation upon exposure to suitable conditions. Such partial curing is often accompanied by an increase in viscosity of the pre-coat formulation. Namely, when exposed to conditions permitting partial curing, the pre-coat formulation may be partially cured to a degree of between 0.1% and 99%, typically up to 50-75%. In other words, once exposed to said conditions, between 0.1 and 99%, more typically up to 50-75% of the polymerizable molecules in the pre-coat formulation undergo polymerization, thereby increasing the viscosity of the pre-coat layer.

It is of note that partial curing and complete curing may be obtained by the use of photo-initiators as described herein. However, partial curing and complete curing may also be obtained by any other suitable mechanism, means or condition(s) that causes polymerization of at least some of the polymerizable molecules in the pre-coat formulation and/or cause a desired increase in viscosity.

Thus, in some embodiments, the conditions permitting partial curing are one or more conditions selected from exposure to irradiation with a radiation source of a defined band/wavelength, exposure to a magnetic source, exposure to electrical fields, irradiation by an electron beam, dark curing, exposure to IR radiation, or exposure to high or low temperatures. The conditions permitting partial curing may be applied, i.e. the pre-coat regions may be exposed to said conditions, for a sufficient period of time in order to obtain the desired difference. Such a period of time may range, for example, between several microseconds to several minutes.

In an exemplary, non-limited case, where the regions differ in their chemical composition, the photo-initiator in some of the regions may be activated upon exposure to said partial curing conditions, while a different photo-initiator present in different regions will not be activated, thereby rendering the regions with different degrees of curing. Thus, in some embodiments, at least two of said patterned regions differ in their degrees of curing.

In another exemplary, non-limited case, where the regions differ in their chemical composition, the polymerizable moieties in some of the regions may be activated upon exposure to a first temperature, while other polymerizable moieties present in different regions will be activated at a different, second temperature, thereby rendering the regions with different degrees of curing.

In some embodiments, at least two of said patterned regions differ in their viscosity. Differences in viscosity may be obtained by any means known to a person of skill, i.e. by varying the viscosities and/or molecular weights of the pre-coat formulation in each region, adding or subtracting viscosity-modifying components from different pre-coat formulation regions, selective evaporation of solvents from different regions, etc.

As noted above, the pre-coat formulations are typically in liquid form, partial (and also completion of) curing is often accompanied by an increase in viscosity, which is typically observed as semi-solidification and/or gelling of the pre-coat formulation; i.e. when the pre-coat formulation's viscosity increases, said region becomes more resistant to applied stresses. Such semi-solidification may permit sufficient fixation of the pre-coat formulation onto the surface on the one hand, and the ability to apply patterning formulations onto the pre-coat layer without awaiting full polymerization (or curing) thereof on the other hand. Namely, the differences in the viscosity (and/or curing degrees) of various regions afford the application and fixation of patterning formulations onto the pre-coat layer without requiring curing/drying steps in between such applications, enabling a so-called wet-on-wet (or wet-on-semiwet) printing.

In some embodiments, a photo-initiator is used for increasing the viscosity of the pre-coat formulation once applied onto the surface, however, without obtaining full polymerization of the polymerizable species in the pre-coat formulation, rendering the partially-cured regions sticky to enable application of other formulations, e.g. patterning formulations, thereonto. Non-limiting examples for such photo-initiators may be piperazin-based aminoalkylphenone (Omnipol 910), di-ester of carboxymethoxy thioxanthone and polytetramethyleneglycol (Omnipol TX), bis(2,4,6-trimethylbenzoyl)phenylphosphine oxide (irgacure 819) or 4-hydroxylbenzophenone laurate (Omnirad 4HBL).

In other embodiments, the increase in viscosity is obtained by applying any suitable condition that enables increase of viscosity or partial curing (e.g. irradiation with a radiation source of a defined band/wavelength, exposure to a magnetic source, exposure to electrical fields, irradiation by an electron beam, dark curing, exposure to IR radiation, or exposure to high or low temperatures, etc.).

In some embodiments, the differences in viscosity between the regions may be of an order of magnitude or several orders of magnitude. For example, some of the regions may have a viscosity of several tenths centipoises, while other regions may have a viscosity of hundreds, thousands or even more centipoises.

Another property, according to some embodiments, that may differ between the regions is their thickness. Namely, some pre-coat regions will have different thickness from other pre-coat regions.

In some embodiments, the at least two patterned regions comprise (a) at least one first region coated by pre-coat of a first thickness and (b) at least one second region coated by pre-coat of a second thickness, the second thickness being larger than said first thickness, such that (i) patterning formulation applied onto said first region after said partial curing is at least partially embedded within said pre-coat and (ii) patterning formulation applied onto said second region is maintained on top of the pre-coat.

In some embodiments, the first and second and further regions differ in their thickness; namely, the second regions having a thickness larger than the first regions and the further regions have larger thickness as compared to both the first and second regions. In some embodiments, the second thickness is larger by at least 5%, typically by at least 10%, or even by at least 15% from said first thickness.

In some embodiments, the pre-coat is applied onto the surface to form a plurality of spaced-apart first regions of first thickness, and a plurality of spaced-apart second regions of second thickness.

In other embodiments, the first and second regions are alternately arranged onto the surface. In some other embodiments, the first and second regions each form an ordered array of regions.

According to some embodiments, the first and second (and further regions) are integral one with the other on the surface, i.e. they are continuous, each first region is in contact in at least one point with at least one second region and each of the second regions is in contact with at least one first region and at least one further region.

In other embodiments, the at least one first and at least one second regions are integral one with the other and form a line pattern of pre-coat formulation. In such embodiments, the line pattern may have a gradually increasing or a gradually decreasing thickness along the line pattern, as will be further explained herein.

When the regions vary in their thickness, the exposure of the pre-coated surface to the partially curing conditions cause partial curing and/or increase the viscosity of pre-coat formulation. The different thicknesses of the pre-coat in the first and second and further regions allow obtaining pre-coated regions having different local curing/viscosity degrees. It has been found that regions having larger thickness (i.e. the second regions) will show a higher degree of curing and/or higher viscosity than regions of smaller thickness (i.e. the first regions) when exposed to identical conditions permitting partial curing conditions.

In regions of low thickness (i.e. the first regions), the surface area per volume of the regions is larger than the surface area per volume of regions of greater thicknesses (i.e. the second regions and the further regions). Without wishing to be bound by theory, curing processes are sensitive to atmospheric oxygen and are often hindered exposure to oxygenation conditions.

For example, in cases where photo-initiators are used to partially cure the pre-coat formulation, exposure to oxygen may inhibit, degrade or poison the photo-initiator. In such cases, the higher the surface per volume of the region, the larger the extent of initiator degradation (or poisoning) due to interaction with atmospheric oxygen, thus preventing or inhibiting curing in regions of higher the surface are per volume. In methods of the invention, this allows obtaining a pre-coated surface characterized by first, low thickness, regions of lower degree of curing ("softer" regions) and second, thicker, regions of a higher degree of curing ("harder" regions).

Thus, different thicknesses and/or different formulations of the pre-coat will result in different curing degrees, resulting in regions of different properties. Once a droplet of patterning formulation is applied onto each region, due to the difference in their properties, the patterning formulation will interact differently with the pre-coat formulation at different regions.

As the first regions have a lower degree of curing (i.e. forming a softer pre-coat portion), a droplet of patterning formulation applied thereon will penetrate the pre-coat, thereby becoming at least partially embedded, at times substantially completely embedded, within the pre-coat; while a droplet of patterning formulation applied onto the second regions, which are of a higher degree of curing, will be remain on top of the pre-coat, at times without any or substantial penetration into the pre-coat.

This variance in penetration of the patterning formulation, resulting from the variance of pre-coat properties at different portions allows printing of smooth skin tones, pigment gradation effects, and spot areas over relatively large surfaces. Such embedding may be also utilized for stacking of various patterning formulations one on top of the other in a highly controllable manner.

In the harder pre-coat portions, no substantial penetration of the patterning formulation into the pre-coat occurs. This may be used, for example, to create an embossing effect, sharpness effect and fine lettering patterns.

The patterning formulation typically comprises at least one polymerizable component (such as monomers, oligomers or cross-linkable polymeric chains), the same or different from that in the pre-coat formulation, and at least one pigment. When applying 2 or more patterning formulations, each patterning formulation may comprise a different pigment. For example, in a method of the invention, first a transparent pre-coat formulation is applied in order to form a transparent pre-coat layer onto the surface, and at least 4 patterning formulations, each of which comprising a different pigment, for example selected from cyan, magenta, yellow and black (or key), also known as CMYK colors are then applied thereonto.

The pigment may be a chemical agent rendering the patterning formulation with a desired color or other desired property. In some embodiments, the pigment is selected from a chromophore, a salt, an encapsulated pigment powder, thermochromic pigments, fluorescent pigments, security tagging agents, inorganic pigments, organic pigments, or any other suitable form known in the art. The term also encompasses metallic particles, conductive pigments, magnetic particles, glass or ceramic particles (frit), luminescent pigments, etc.

The patterning formulation may further comprise various additives, such as cross-linking agents, photo-initiators, diluent, viscosity modifiers, surface tension modifiers, fillers, surfactants, stabilizers, metallic particles, conductive particles, magnetic particles, etc.

In some embodiments, the pre-coat formulation and the patterning formulation(s) are capable of chemically reacting one with the other. Thus, according to such embodiments, at least one pre-coat formulation may comprise an agent being capable of chemically reacting with a complementary agent in the patterning formulation(s). In some embodiments, the agent may be an acid or an acidic moiety and said complementary agent may be a base or a basic moiety.

The method of the invention may further comprise, prior to applying at least one patterning formulation, application of at least one intermediate formulation. In some embodiments, the intermediate formulation comprises a white pigment or any known white powder (such as silica, alumina, other metal oxides, talc, clays, etc.).

When two or more intermediate formulations are applied to the same surface portion, at least one of the intermediate formulations need not to include all of the formulation's components. Namely, at least one of the intermediate formulations may include only some of the components of the intermediate formulation, such that once a mixture of intermediate formulations is obtained at said surface portion, the mixture includes all of the necessary components enabling the functionality of the intermediate layer at said region. By way of example, when printing two intermediate formulations onto the same surface portion, one of the formulations may comprise a surfactant, while the other may be devoid of surfactant. When the formulations are printed onto the same surface portion, their mixture may result in the desired surfactant content for enabling the desired functionality at that surface portion.

When more than one intermediate formulation is used, the intermediate formulations may be applied onto the surface by sequential or concomitant printing using the same printing nozzle. Alternatively, each of the formulations may be printed from a dedicated nozzle, the nozzles being adjacent one another in the printing system.

According to some embodiments, the patterning method includes applying at least one intermediate formulation onto the partially cured pre-coat layer in advance; in other embodiments, the intermediate formulation may be applied onto the pre-coat layer immediately prior to application of the at least one patterning formulation. The intermediate formulation may be applied onto the entire surface of the substrate or onto desired sections thereof in accordance with the pattern design. In some embodiments, the at least one intermediate formulation comprises an agent being capable of chemically reacting with a complementary agent in at least one of the patterning formulation(s).

In other embodiments, some sections of the surface may be printed with one intermediate formulation, while other sections may be printed with another, different, intermediate formulation. In some other embodiments, some of the sections may be printed with a single intermediate formulation, while other sections may be printed with at least two intermediate formulations.

In some embodiments, the intermediate formulation has similar functional components as the pre-coat formulation. Namely, in such embodiments, the intermediate formulation may comprise one or more photo-initiators (the same or different than those in the pre-coat formulation), may include functional groups for chemical interaction with one or more complementary chemical groups in the patterning formulations, etc. The pattern of the intermediate formulation may or may not be the same as the pattern of the pre-coat or any of the patterning formulations. In some embodiments, the pre-coat covers a larger portion of the surface, wherein the intermediate formulation covers a smaller region of the pre-coat or a portion of a different design or structure, and further wherein the final printed pattern obtained by printing a patterning formulation has a design or structure different from both the pre-coat design or structure and the intermediate formulation design or structure.

After application of the patterning formulations, the coated surface is exposed to conditions permitting completion of curing, thereby obtaining a patterned surface. Namely, in methods of the invention, exposing to conditions permitting completion of curing occurs only after completion of the patterning (i.e. printing the entire desired pattern), thereby circumventing the need to at least partially cure the pattern between applications of each different patterning formulations. In addition to enabling the built-up of several layers of different patterning formulations within the pre-coat in a process-efficient manner, this also allows obtaining a relatively durable coating, as curing of the entire printed pattern (i.e. curing of all pattern layers) is carried out at a single process step, and not layer-by-layer or pass-by-pass.

As noted above, conditions permitting completion of curing refer to at least one of exposure to exposure to irradiation with a radiation source of a defined band/wavelength, exposure to a magnetic source, exposure to electrical fields, irradiation by an electron beam, dark curing, exposure to IR radiation, or exposure to high or low temperatures, such that the polymerization process of the partially cured pre-coat is allowed to continue, typically at least up to a curing degree of 80% (at times at least to 90%, 95% or even higher). The coated surface is exposed to said conditions for a period of time allowing substantially complete curing of the pre-coat and patterning formulation(s).

In some embodiments, the period of time in which the coated surface is exposed to the curing completion conditions may vary between 0.1 and 10 seconds (or example, exposure to 800-1600 W UV lamp for between 0.1 and 10 seconds).

In other embodiments, the curing completion conditions include irradiation with an UV radiation source in a wavelength of between 200 and 470 nanometers.

According to some embodiments, the pre-coat formulation comprises at least two photo-initiators, a first of which is activated by said partial curing conditions and the second being activated by said curing completion conditions.

According to other embodiments, the radiation wavelength used for partial curing and the radiation wavelength used for complete curing are substantially the same, however partial curing is carried out by shorter exposure to said wavelength, a different intensity of the radiation, or a combination of both. According to some other embodiments, different radiation wavelengths are used for partial and complete curing. According to some other embodiments, the partial and complete curing conditions differ by all of radiation wavelengths, exposure time and radiation intensity.

As noted above, in cases where the pre-coat formulation comprises at least two photo-initiators, the first photo-initiators may be activatable upon exposure to said partial curing conditions, while the second photo-initiator is activatable upon exposure to the curing completion conditions. For example, the first photo-initiator may be activated by exposure to first wavelength of between about 365 and 470 nm, while the second photo-initiator may be activated by exposure to a different wavelength, sufficiently different from the activation wavelength of the first photo-initiator. In some embodiments, the second wavelength is between about 200 and 470 nm.

It is also of note that the first and second photo-initiators may be constituted by the same chemical molecule. In such cases, the molecule will contain 2 distinct moieties, a first of which being activatable by said first wavelength and the other being activatable by said second wavelength. In such cases, the first photo-initiator is not consumed completely upon exposure to irradiation in the first wavelength, and leftovers are activated when the formulation is exposed to irradiation in said second wavelength.

The pre-coat formulation used in methods of the invention may be any pre-coat formulation that enables obtaining regions of different curing degrees depending on the thickness of the pre-coat in said regions. Similarly, patterning formulations suitable for use in methods of the invention are those that provide at least partial embedding within and spreading onto the pre-coat, depending on the degree of curing of the pre-coat. The patterning formulations typically comprise at least one pigment.

In another aspect of the invention, there is provided a patterned article, comprising:

an article having a surface;

a pre-coat layer on a region of said surface, the pre-coat layer forming patterned regions, at least two of said patterned regions differing from each other in at least one of a chemical and a physical property; and at least one layer of a patterning formulation being in interaction with the pre-coat layer, the interaction between the patterning formulation layer and the pre-coat layer being determined by said chemical and physical properties, such that the patterning formulation layer being (i) at least partially embedded within said pre-coat layer, or (ii) maintained on top of the pre-coat layer.

In some embodiments, the article further comprises at least one layer of intermediate composition, disposed onto said pre-coat layer, and interacting with said pre-coat layer, such that the intermediate formulation layer being (i) at least partially embedded within said pre-coat layer, or (ii) maintained on top of the pre-coat layer.

In another aspect of the invention, there is provided a patterned article, comprising:

an article having a surface;

a pre-coat layer onto said surface, the pre-coat layer having at least one first region of a first thickness and at least one second region of a second thickness, said second thickness being larger than said first thickness; and at least one pattern layer of a patterning formulation, being (i) at least partially embedded within said first regions and (ii) maintained on top of said second region of the pre-coat layer.

In some embodiments, the second thickness is larger by at least 5% from said first thickness.

In some embodiments, pre-coat layer comprises a plurality of spaced-apart regions of first thickness, and a plurality of spaced-apart regions of second or further thicknesses. In other embodiments, the regions are alternately arranged in said pre-coat layer. In some other embodiments, the regions each form an ordered array of regions within the pre-coat layer.

According to some embodiments, the regions are integral one with the other, i.e. each first region is in contact with at least one second region.

In some embodiments, the pre-coat layer covers substantially the entire surface.

According to some embodiments, the at least one patterning formulation comprises a pigment.

The article of the invention, comprising an intermediate layer positioned between the pre-coat layer and the pattern layer. In such embodiments, the intermediate layer may comprise at least one white pigment.

In some embodiments, the article's surface is convex.

In another aspect, the invention provides a patterned article, comprising:
an article having a surface;
a pre-coat layer on said surface, the pre-coat layer having gradual variability of at least one chemical or physical property along a defined direction; and
at least one line a patterning formulation, wherein said patterning formulation being (i) at least partially embedded within first regions of the pre-coat layer and (ii) on top of second regions of the pre-coat layer, the first and second regions being integral one with the other.

In a further aspect of the invention, there is provided a method forming a line pattern onto a surface, comprising:
forming onto at least a portion of the surface a layer of pre-coat formulation, the layer having a thickness of gradual variability, such that at least one first region of the layer having a thickness smaller by at least 5% from at least one second region of the layer;
exposing said layer to conditions permitting partial curing of the pre-coat formulation onto the surface;
applying at least one line of at least one patterning formulation onto said layer such that (i) patterning formulation applied onto said first region becomes at least partially embedded within said layer and (ii) patterning formulation applied onto said second region is maintained on top of said second region to obtain a pre-cured line pattern; and
exposing said at pre-cured line pattern to conditions permitting completion of curing thereby obtaining a line pattern onto said surface.

In another aspect, the invention provides an article having a line patterned surface, comprising:
a pre-coat layer having a thickness of gradual variability onto said surface, such that at least one first region of the layer having a thickness smaller than a threshold thickness and at least one second region of the layer having a thickness larger than said threshold thickness; and
at least one line a patterning formulation, wherein said patterning formulation being (i) at least partially embedded within said first regions and (ii) on top of said second regions of the pre-coat layer.

The term line pattern denotes an uninterrupted continuity of the patterning formulation along a line, straight or curved. This is enabled by the gradual variability in the chemical or physical property, of the pre-coat layer, which is gradually and consecutively increased or decreased.

A specific example of such variable property change is gradual variability in thickness of the pre-coat layer. In regions having a thickness below a thickness threshold, the line pattern will be at least partially embedded within the pre-coat layer; while in regions where the thickness of the pre-coat is larger than the thickness threshold, the line-pattern will be formed onto the surface of the regions. This enables formation of line patterns which are in part encapsulated by the pre-coat layer and in part exposed on the surface of the article.

In some embodiments, the pre-coat layer has a gradually increasing or a gradually decreasing thickness along the line pattern.

In some other embodiments, the pre-coat layer has a wedge-like profile, i.e. of a continuous increasing or decreasing thickness having a constant slope. In other embodiments, the pre-coat layer has a profile of continuously alternating increasing and decreasing thickness.

As a person of the art may appreciate, in the methods of this disclosure, the application of any (or all) of the pre-coat formulation, intermediate formulation and/or the patterning formulations may be carried out by any suitable technique, such as dropping, spraying, jetting, smearing, painting, brushing, air-brushing, etc. When applying the formulations in droplet-form, control of the droplet size/volume may be obtained by the dimensions and configuration of the application nozzle, the application pressure, the viscosity of the formulation, or any other parameter known to a person of skill.

As can be appreciated, methods of this disclosure, and patterned surfaces produced thereby, require the use of pre-coat and patterning formulations, i.e. printing inks, suitable for such methods, which may be printing-ink systems as will not be described.

Printing-Ink Systems

As already noted, unlike traditional ink-jet printing, the ink systems described herein allows high accuracy ink-jet printing, high resolution and optical density, as well as minimization of curing cycles for fixation of the pattern onto a surface. The system of the invention is suitable for printing onto curved surfaces, where traditional printing formulations fail to provide high accuracy printing and high resolution patterns.

In another of its aspects, this disclosure provides a printing-ink system comprising a pre-coat formulation having a surface tension $\gamma_0$, and at least one patterning formulation having a surface tension $\gamma_2$, such that $\gamma_0<\gamma_2$ at ambient conditions; wherein the pre-coat formulation comprising an agent capable of chemically reacting with a complementary agent in the at least one patterning formulation.

The pre-coat formulation and/or the patterning formulations may be those described hereinabove.

The term printing-ink system, which will, for the sake of brevity, be referred to herein as a "system", is meant to encompass a multi-formulation comprising at least 2 different ink formulations, each formulation provided with a distinct set of properties. Thus, the printing-ink system may comprise 2, 3, 4, 5, 6, or more than 6 different ink formulations. The formulations are typically liquid, and may be in the form of a homogenous solution (i.e. in which each components is soluble in the other components of the formulation), or in the form of a dispersion or suspension, in which some components of the formulation are dispersed or suspended in other components of the formulation.

Each of the formulations may be characterized by at least a distinct surface tension. Within the context of the present invention, the surface tension will refer to the property of the formulation to minimize its surface energy. Namely, the surface tension is the attraction force applied onto surface molecules by their neighboring molecules in order to maintain cohesiveness and minimize the exposed surface area. The surface tension is identified herein as $\gamma_i$, wherein i is a numerical index of the relevant formulation, as will be defined herein.

The surface tension values are provided for ambient conditions, which, unless otherwise recited, will refer to atmospheric pressure and a temperature of 25° C.

In accordance with this disclosure, the system comprises at least two formulations: one being a pre-coat formulation (which may or may not be a formulation as described hereinabove) having a surface tension $\gamma_0$, and the other being at least one patterning formulation having a surface tension $\gamma_2$, such that $\gamma_0 < \gamma_2$. In some embodiments, $\gamma_2$ is larger than $\gamma_0$ by at least 3 mN/m.

During printing, the pre-coat formulation is first applied onto a surface, followed by application of drops or spots of the patterning formulation(s), to thereby obtain a desired pattern. Without wishing to be bound by theory, the difference between the surface tensions, as well as the chemical reaction occurring between the different formulations, is another mechanism by which bleeding or feathering of the patterning formulation maybe prevented, thereby obtaining a high patterning resolution and defined (sharp) border-lines between the pre-coat and the patterning formulations.

In some embodiments, the system comprises at least two pre-coat formulations, a first of which having a surface tension $\gamma^1_0$ and a second of which having a surface tension $\gamma^2_0$, such that $\gamma^1_0 < \gamma_2$ and $\gamma^2_0 \sim \gamma_2$. When printing, the first pre-coat formulation is first printed onto the surface to form a sufficiently spread pre-coat layer on any desired surface, while the second pre-coat formulation is printed thereonto to form a suitable basis for subsequent printing of the patterning formulations.

While the pre-coat formulation is typically clear or transparent, the at least one patterning formulation, by some embodiments, comprises a pigment. When comprising 2 or more patterning formulations, each patterning formulation may comprise a different pigment. For example, a system of the invention may comprise one clear pre-coat formulation in order to form a transparent pre-coat layer onto the surface, and 4 patterning formulations, each of which comprising a different pigment, for example selected from cyan, magenta, yellow and black (or key), also known as CMYK colors.

The difference between the surface tension $\gamma_0$ and the surface tension $\gamma_2$ of each patterning formulation prevents undesired mixing of pigments, as each drop of the patterning formulation is physically fixated onto, and at times at least partially into, the pre-coat layer resulting from the difference in surface tensions. The differences of the surface tensions also controls and limits the spreading of each printed spot or drop, thereby circumventing the need for curing between printing cycles. As mixing of colors is prevented, high resolution may be also obtained.

The relatively low surface tension of the pre-coat formulation ensures relatively rapid and even spreading of the pre-coat formulation onto the surface, thereby providing a uniform layer onto which the pattern may be printed. The pre-coat formulation is designed such that its surface tension will be suitable for printing onto different substrates. In order to obtain proper coating, i.e. spreading and leveling, of the pre-coat onto substrates having various surface tensions and roughness levels, in some embodiments, the surface tension of the pre-coat, $\gamma_0$, is at most 37 mN/m. In some embodiments, the pre-coat formulation may have a surface tension $\gamma_0$ of between about 20 and about 37 mN/m, between about 20 mN/m and 36 mN/m, between about 20 mN/m and 35 mN/m, or even between about 20 mN/m and 33 mN/m.

Further fixation of the pattern may be obtained by a chemical reaction. Thus, the patterning formulation comprises an agent that is capable of chemically reacting with at least one other agent (the so-called "complementary agent" as defined below) in the pre-coat formulation upon contact therebetween, or vice versa. Wherein more than one patterning formulation is used, each patterning formulation may comprise a different agent, each such agent capable of chemically reacting with the complementary agent in the pre-coat.

The chemical reaction may be any reaction known in the art, for example, an acid-base reaction, a redox reaction, ionic bonding, complexation, etc. In some embodiments, the agent and the complementary agent are a base moiety and an acid moiety, respectively.

According to some embodiments, the agent is a polymer, oligomer or monomer, functionalized with basic functional groups. Meaning, that the agent may be a polymer, oligomer or monomer having basic (i.e. reacting as a base) functional groups pending on its carbonaceous backbone.

Non-limiting examples of suitable polymers are polymethylacrylate (PMA), polymethylmethacrylate (PMMA), polyethylacrylate, poly(ethylhexyl)acrylate, polyhydroxyethyl methacrylate, polybutylacrylate, polybutylmethacrylate, Trimethylolpropane triacrylate (TMPTA), tri-ethoxy triacrylate (TMP(EO)$_3$TA), epoxy acrylates, polyester acrylate, urethane acrylate, and their corresponding monomers, each of which, in some embodiments, being functionalized with basic groups which may be selected from primary amines, secondary amines, tertiary amines, hydroxyl groups, amides, or any other basic functional group.

In other embodiments, the agent is an acrylated oligoamine resin, or an amine modified acrylate.

In some embodiments, the complementary agent is a polymer oligomer or monomer functionalized with acidic functional groups. Meaning, that the complementary agent may be a polymer, oligomer or monomer having acidic (i.e. reacting as an acid) functional groups pending on its carbonaceous backbone. Non-limiting examples of suitable polymers are polymethylacrylate (PMA), polymethylmethacrylate (PMMA), polyethylacrylate, poly(ethylhexyl)acrylate, polyhydroxyethyl methacrylate, polybutylacrylate, polybutylmethacrylate, Trimethylolpropane triacrylate (TMPTA), tri-ethoxy triacrylate (TMP(EO)$_3$TA), epoxy acrylates, chlorinated polyester acrylate, polyacrylic acid, acid functional acrylate, acid functional methacrylate, and their corresponding monomers, each of which, in some embodiments, being functionalized with acidic groups which may be selected from carboxyl groups, sulfonic acid groups ($-SO_2OH$), thiols, and enols.

In some embodiments, the complementary agent may be an acidic-functionalized compound, such as mono-2-acryloyloxyethyl phthalate (1,2-benzenedicarboxylic)acid.

When printing on transparent or colored surfaces it is sometimes desired to first form a colored, typically white or opaque, intermediate layer prior to forming the pattern. For this purpose, according to some embodiments, the printing-ink system further comprises an intermediate-coat formulation, distinguishable from the pre-coat formulation.

In some embodiments, the intermediate formulation comprises at least one other pigment, being the same or different from the pigment of the patterning formulation. For example, the system may comprise at least one transparent pre-coat formulation, at least one white intermediate formulation and at least patterning formulation comprising, each comprising one of the CMYK colors.

The intermediate formulation is further selected to have a surface tension $\gamma_1$, such that $\gamma_0 < \gamma_1 \leq \gamma_2$ at ambient conditions.

The intermediate formulation is applied onto the pre-coat layer. Similar to the patterning formulations, the surface tension of the intermediate formulation is higher than that of the pre-coat. Thus, the intermediate formulation may be applied and physically fixated, i.e. immobilized, to specific regions of the surface in accordance with the desired pattern design. Then, the patterning formulation is applied, and as the patterning formulation is of at least comparable surface tension with that of the intermediate-coat, at times even higher than the intermediate formulation's surface tension, the printed pattern remains physically fixated onto the pre-coat layer and the intermediate-layer. Thus, in some embodiments, the surface tension $\gamma_1$ of the intermediate formulation is larger by at least 3 mN/m from the surface tension $\gamma_0$ of the pre-coat.

When two or more intermediate formulations are applied to the same surface portion, at least one of the intermediate formulations need not to include all of the formulation's components. Namely, at least one of the intermediate formulations may include only some of the components of the intermediate formulation, such that once a mixture of intermediate formulations is obtained at said surface portion, the mixture includes all of the necessary components enabling the functionality of the intermediate layer at said region. By way of example, when printing two intermediate formulations onto the same surface portion, one of the formulations may comprise a surfactant, while the other may be devoid of surfactant. When the formulations are printed onto the same surface portion, their mixture may result in the desired surfactant content for enabling the desired functionality at that surface portion.

Similarly to the pre-coat, the intermediate formulation may comprise at least one other complementary agent being capable of chemically reacting with the agent in the pattering formulation(s). Therefore, in addition to the physical fixation obtained by the differences in surface tensions, the patterning formulation may be further fixed into position by a chemical reaction with the intermediate formulation, when such is applied.

In other embodiments, the complementary agent in the pre-coat formulation and the other complementary agent in the intermediate formulation are the same.

According to some embodiments, the one other complementary agent is a polymer, oligomer or monomer, each functionalized with acidic functional groups, which may be the same or different from that of the pre-coat formulation.

As a person of the art may appreciate, this disclosure in not limited to combinations by which the pre-coat formulation and/or intermediate formulation comprises an agent and the patterning formulation(s) comprises a complementary agent as defined herein. Thus, the present disclosure also encompasses systems wherein the patterning formulations comprise said agent, while the pre-coat formulation and/or the intermediate formulation comprise said complementary agent. Other possible combinations envisioned by the present disclosure include: (i) a pre-coat formulation comprising the agent and a patterning formulation comprising the complementary agent; (ii) a pre-coat formulation comprising the complementary agent and a patterning formulation comprising the agent; (iii) a pre-coat formulation comprising the agent, an intermediate formulation comprising the agent, and a patterning formulation comprising the complementary agent; (iv) a pre-coat formulation comprising the complementary agent, an intermediate formulation comprising the complementary agent, and a patterning formulation comprising the agent; (v) a pre-coat formulation comprising the agent, an intermediate formulation comprising the complementary agent, and a patterning formulation comprising the complementary agent; (vi) a pre-coat formulation comprising the complementary agent, an intermediate formulation comprising the agent, and a patterning formulation comprising the agent; (vii) a pre-coat formulation comprising the complementary agent, an intermediate formulation comprising the agent, and a patterning formulation comprising the complementary agent; or (viii) a pre-coat formulation comprising the agent, an intermediate formulation comprising the complementary agent, and a patterning formulation comprising the agent.

The reaction between the agent, e.g. basic moiety, and at least one of the complementary agent and the other complementary agent, e.g. having acidic moieties, causes increase in the viscosity of the patterning formulation(s). This increase in viscosity further assists in obtaining fixation of the pattering formulation onto the pre-coat and/or the intermediate layer.

In some embodiments, the at least one patterning formulation has an initial viscosity $\mu_2^0$ and upon chemical reaction between said agent and said complementary agent the viscosity of the at least one patterning formulation increases by at least an order of magnitude to a viscosity $\mu_2$.

In the context of the present disclosure, at least an order of magnitude refers to increase of an initial value by at least 10-folds, at least 100-folds, at least 1,000-folds or even at least 10,000-folds. Namely, the initial viscosity $\mu_2^0$ of the patterning formulation will increase at least to at least $10\mu_2^0$ after occurrence of chemical reaction between the agent and at least one of the complementary agents.

In some embodiments, $\mu_2^0$ may be at least 10 cps, at least 50 cps or even at least 100 cps, and $\mu_2$ is at least 100, at least 50000 cps or at least 100,000 cps.

It is of note that the increase in viscosity, controlled by the chemical reaction between the patterning formulation and at least one of the pre-coat and intermediate formulations, may also determine the position of the drops of patterning formulations applied with respect to the pre-coat and the intermediate formulations.

Namely, by tailoring the balance between the surface tensions and the changes in viscosity of the different layers, the position of a drop of patterning formulation may be controlled. Without wishing to be bound by theory, changing the balance between surface tension and viscosity leads to control of the extent a drop of patterning formulation is embedded within the pre-coat and or the intermediate-coat layers. In general, the larger the difference between the surface tension of the pre-coat formulation from the surface tension of a the patterning formulation, the more a drop of patterning formulation will be laterally spread, thereby obtaining high resolution between printed spots/dots. Further, controlling the chemistry of the fixation, i.e. the rate by which the chemical reaction occurs to increase the viscosity of the patterning formulation applied onto the pre-coat/intermediate formulation determines the rate of fixation of the spot in position. Thus, in slower chemical reactions, a drop of patterning formulation may at least partially penetrate the pre-coat/intermediate layer. Changing the balance between the difference in surface tension and the rate/type of chemical reaction may be used to control the position of patterning formulations drops applied onto the surface, the depth of their penetration into bottom coating layers, as well as the extent of their lateral spreading prior to fixation. This, in turn, enables obtaining various printing effects, high resolution texts (i.e. letters with sharp edges), embossing effects, efficient printing of continuous color surfaces, highly-controlled graduation of color tones, etc., without the need to carry out a curing/drying process between the printing of each layer or each patterning formulation (i.e. no need to cure the layers between printing of different colors in a given printing sequence). The system of the invention, thus, enables printing of the entire desired pattern as a wet-on-wet printing process, avoiding curing steps in between printed layers and/or during printing of each layer, thereby saving valuable printing time, costs and simplifying the printing production line.

To afford final fixation of the printed pattern onto the surface, the patterns are typically exposed, after printing of all desired layers, to a light-source for curing (i.e. polymerization or cross-linking) of the formulations. To this end, each formulation in the system may independently comprise, according to some embodiments, at least one photo-initiator. As noted above, the photo-initiator is typically used for increasing the rate of one or more steps in the curing mechanism by providing a reaction path having lower activation energy.

In some embodiments, the photo-initiator is UV-sensitive, namely activated by UV radiation, typically in a wavelength of between about 200 nm and 470 nm. Exemplary, non-limiting, photo-initiators are aromatic ketones, organic phosphines, benzyl peroxide, benzophenone, etc. It is to be understood that polymeric photo-initiators (i.e. polymer agents which are photo-initiators) are also suitable.

As noted above, the wavelength is meant to denote a radiation band, i.e. irradiation in a band of wavelengths, which may broad or narrow (depending on the irradiation source used). The term is also meant to encompass monochromatic radiation at a defined (single) wavelength.

As also noted above, in some embodiments, the properties of the system formulations are designed, by attenuation of the surface tensions and the chemical reaction rates, to allow at least partial penetration of the patterning formulation into either or both of the pre-coat layer and the intermediate layer, i.e., the difference in surface tensions and the rate of the chemical reaction may be tuned by the addition of different additives to allow the patterning formulation to be at least partially coated by either or both of the pre-coat layer and the intermediate layer.

In some embodiments, once applied onto the pre-coat or the intermediate layer, the pattern is fully coated by the pre-coat or the intermediate layer, respectively. Namely, the drops of the patterning formulation(s) may be completely embedded within the pre-coat/intermediate layer. This results in a patterned coating which is of even thickness throughout the printed surface (i.e. no significant height differences in the printed layer result due to stacking of printed layers).

According to some embodiments, each of the formulations in the system may independently comprise different additives, such as at least one of a diluent, a surfactant, a surface-tension modifier, a free-radical scavenger, and a viscosity modifier.

In some embodiments, the diluent is selected from at least one (optionally substituted) aliphatic diluent, at least one (optionally) substituted aromatic diluent, and mixtures thereof. In other embodiments, the diluent is one or more of an acrylic acid esters, polyetherpolyol acrylates, modified polydymethylsiloxanes, etc.

Pigments may be present in the formulation, typically in the intermediate formulation and the patterning formulation(s), in various forms. As already noted above, the pigment is any chemical agent rendering the patterning formulation with a desired color or other desired property. In some embodiments, the pigment is selected from a chromophore, a salt, an encapsulated pigment powder, thermochromics pigments, fluorescent pigments, security tagging agents, inorganic pigments, organic pigments, or any other suitable form known in the art. The term also encompasses metallic particles, conductive pigments, magnetic particles, glass or ceramic particles (frit), luminescent pigments, etc. In some embodiments, each of the pigments may be independently in the form of a chromophore, an organic salt, and inorganic salt, an oxide, a chromate, etc. In other embodiments, the pigments may each be encapsulated within shells, for example in the form of micro or nano-capsules, in which the shells are degradable upon contact with the pre-coat formulation or a suitable degrading additive in the pre-coat formulation.

In some embodiments, each of the formulations, i.e., pre-coat formulation, the intermediate formulation and the at least one patterning formulation, is substantially free of solvent, such that no evaporation or prolonged drying times are required for obtaining a printed pattern. As one or more of the components used to formulate the pre-coat, intermediate and/or patterning formulations may be in the form of a solution, namely comprising a native solvent that is used to dissolve therein a specific component, the term substantially devoid of solvents means to denote a concentration of solvent that does not have a significant effect on the properties of the formulation and/or the printed pattern (e.g. viscosity, surface tension, tackiness, curing profile, etc.). In some embodiments, the pre-coat, intermediate and patterning formulation(s) may each, independently, comprise trace amounts of solvents, i.e. impurities of solvents that originate from the components used to formulate the pre-coat formulation (e.g. up to 5 wt % of solvent).

In another aspect, the invention provides a printing-ink system comprising a pre-coat formulation having a surface tension $\gamma_0$; an intermediate formulation having a surface tension $\gamma_1$; and at least one patterning formulation having a surface tension $\gamma_2$; such that $\gamma_0 < \gamma_1 \leq \gamma_2$ at ambient conditions.

In another aspect, the invention provides a method of forming a pattern, e.g., a 2D or 3D pattern, on a surface, the method comprising applying at least one patterning formulation onto a surface to obtain a pattern, the surface being at least partially pre-coated by a pre-coat formulation; the pre-coat formulation having a surface tension $\gamma_0$ and the at least one patterning formulation having a surface tension $\gamma_2$, such that $\gamma_0 < \gamma_2$ at ambient conditions, the at least one patterning formulation comprises an agent being capable of chemically reacting with a complementary agent in the pre-coat formulation.

The term surface, substrate, sections, regions, and portions have the same meaning as described in the previous chapters described herein.

In some embodiments, the pre-coat may be applied onto the surface in advance; in other embodiments, the pre-coat formulation may be applied onto the surface immediately prior to application of any of the patterning formulations. The pre-coat may be applied onto the entire surface of the substrate or onto desired sections thereof in accordance with the desired pattern.

In some embodiments, the surface is treated with at least one intermediate formulation prior to applying said patterning formulation(s), the intermediate formulation having a surface tension $\gamma_1$, such that $\gamma_0 < \gamma_1 \leq \gamma_2$ at ambient conditions.

According to some embodiments, the intermediate formulation may be applied onto the pre-coat layer in advance; in other embodiments, the intermediate formulation may be applied onto the pre-coat layer immediately prior to application of the at least one patterning formulation. The intermediate formulation may be applied onto the entire surface of the substrate or onto desired sections thereof in accordance with the pattern design.

The pattern of the intermediate formulation may or may not be the same as the pattern of the pre-coat or any of the printed patterns. In some embodiments, the pre-coat covers a larger portion of the surface, wherein the intermediate formulation covers a smaller region of the pre-coat or a portion of a different design or structure, and further wherein the final printed pattern obtained by printing a patterning formulation has a design or structure different from both the pre-coat design or structure and the intermediate layer design or structure.

In some embodiments, the patterning formulation comprises at least one pigment. In other embodiments, the intermediate formulation comprises at least one other pigment. In some other embodiments, the at least one other pigment is different from said at least one pigment.

According to some embodiments, the patterning formulation comprises an agent being capable of chemically reacting with a complementary agent in either or both of the pre-coat and intermediate formulations. Therefore, the method of the invention may further comprise a step of allowing said agent to chemically react with said complementary agent.

In some embodiments, the pattern formed by applying the patterning formulation is allowed to at least partially penetrate the pre-coat layer. In other embodiments, the patterning formulation is allowed to fully penetrate (i.e. to be coated by) the pre-coat layer or the intermediate layer, where applicable.

The method may further comprise, in some embodiments, exposing the surface to full or partial curing conditions after patterning. In some embodiments, the surface is exposed to full or partial curing conditions at different stages during patterning.

Where 2 or more pattering formulations are used, the method may comprise simultaneous application of the patterning formulations. In such embodiments, the exposure to full or partial curing conditions may be carried out during or after finalization of pattern-printing.

Alternatively, each of the patterning formulations may be applied separately, i.e. in a sequence. In such embodiments, partial curing and/or increase in viscosity may be obtained by exposing the printed surface to full or partial curing conditions between applications of the different patterning formulations. In some other embodiments, the step of exposure to full or partial curing conditions is carried out after completion of the patterning sequence.

In another aspect, the invention provides a method of patterning a surface, the method comprising:
(a) applying a pre-coat formulation having a surface tension $\gamma_0$ onto said surface to obtain a pre-coat layer;
(b) optionally applying an intermediate formulation having a surface tension $\gamma_1$ onto said pre-coat layer to obtain an intermediate layer;
(c) applying at least one patterning formulation having a surface tension $\gamma_2$ onto said pre-coat layer to obtain a pattern, wherein $\gamma_0 < \gamma_1 \le \gamma_2$ at ambient conditions, and the patterning formulation comprising an agent being capable of chemically reacting with at least one of (i) a complementary agent in the pre-coat formulation, and (ii) at least one other complementary agent in the intermediate formulation.

According to some embodiments, the chemical reaction between said agent and at least one of the complementary agents increases the viscosity of said at least one patterning formulation. In such embodiments, said at least one patterning formulation has an initial viscosity $\mu_2^0$ and upon chemical reaction between said agent and at least one of said complementary agents, the viscosity of the at least one patterning formulation increases by at least an order of magnitude to a viscosity $\mu_2$.

In other embodiments, the method may further comprise exposing the surface to curing conditions after patterning. The curing conditions may comprise, however may not be limited to, exposure to full or partial curing conditions. Thus, the method may further comprise, in some embodiments, a step (a1) exposing said pre-coat formulation to irradiation for increasing an initial viscosity $\mu_0^0$ of the pre-coat formulation by at least an order of magnitude to a viscosity $\mu_0$, such that step (a1) being carried prior to application of any of the intermediate coat or the patterning formulations.

The method, in other embodiments when an intermediate formulation is applied, may further comprise a step (b1) exposing said intermediate formulation to irradiation for increasing an initial viscosity $\mu_1^0$ of the intermediate formulation by at least an order of magnitude to a viscosity $\mu_1$, such that step (b1) being carried prior to application of the patterning formulation.

The irradiation in each of steps (a1), (b1) and after completion of the patterning may be of the same, but of typically different wavelengths. Thus, the irradiation in each of steps (a1), (b1) and completion of patterning may independently be applied at a wavelength of between about 365-470 nm and 200-470 nm, respectively.

As a person of the art may appreciate, in the methods of this disclosure, the application of any (or all) of the pre-coat formulation, intermediate formulation and/or the patterning formulations may be carried out by any suitable technique, such as dropping, spraying, jetting, smearing, painting, brushing, air-brushing, etc. When applying the formulations in droplet-form, control of the droplet size/volume may be obtained by the dimensions and configuration of the application nozzle, the application pressure, the viscosity of the formulation, or any other parameter known to a person of skill.

In another one of its aspects, the present disclosure provides a kit comprising:
a first container comprising a pre-coat formulation,
optionally a second container comprising an intermediate-coat formulation, and
at least one third container comprising at least one patterning formulation;

the pre-coat formulation having a surface tension $\gamma_0$, the intermediate-coat formulation having a surface tension $\gamma_1$, and the at least one patterning formulation having a surface tension $\gamma_2$, such that $\gamma_0 < \gamma_1 \le 2$ at ambient conditions, the patterning formulation comprising an agent being capable of chemically reacting with at least one of (i) a complementary agent in the pre-coat formulation, and (ii) at least one other complementary agent in the intermediate-coat formulation.

It will be appreciated that when more than one pre-coat formulations are used, the kit will include more than one first container. Similarly, when more than one intermediate formulations are used, the kit will include more than one second container.

In some embodiments, each of the containers comprised in the kit are made available separately and may be combined for performing the innovative aspects of the invention.

Each of the first, second and third containers may be a generic container as known to any person of skill in the art. In some embodiments, the each of the containers is adapted to fit into a print-head of a suitable patterning printer, such as an ink-jet printer.

In some embodiments, the kit further comprises a housing for holding at least 2 of the first, second and third containers. In such embodiments, the housing may be a cartridge, hosing at least 2 compartments for receiving said at least 2 containers.

In other embodiments, each of the first, second and third containers, may be constituted by a first, second and third compartments, respectively, of a cartridge.

Unless specifically described, all viscosity and surface tension values mentioned herein refer to values at room temperature (23-25° C.) and atmospheric pressure.

As used herein, the term "about" is meant to encompass deviation of ±10% from the specifically mentioned value of a parameter, such as temperature, concentration, etc.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 7A-7B show comparative printing quality of image and text printed on a polymeric surface with a pre-coat formulation having high surface tension (FIG. 7A) a pre-coat formulation having low surface tension (FIG. 7B).

FIGS. 8A-8B are close up images of a text portion of the printed surfaces of FIGS. 7A and 7B, respectively.

DETAILED DESCRIPTION OF EMBODIMENTS

Exemplary Schematic Illustration of Pre-Coated Surfaces

Figure 1A:
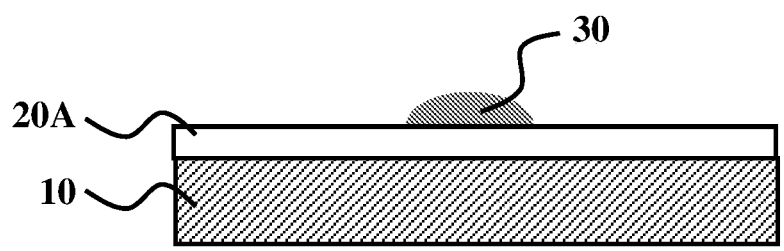
FIGS. 1A-1C shows schematic cross-sections of a patterned surface in accordance with an embodiment of this disclosure, having pre-coat regions of different properties: a droplet of patterning formulation is maintained on top of a pre-coat region (FIG. 1A), a droplet of patterning formulation is allowed to partially penetrate the pre-coat region (FIG. 1B), and a droplet of patterning formulation fully penetrates the pre-coat region (FIG. 1C).
Figure 1B:
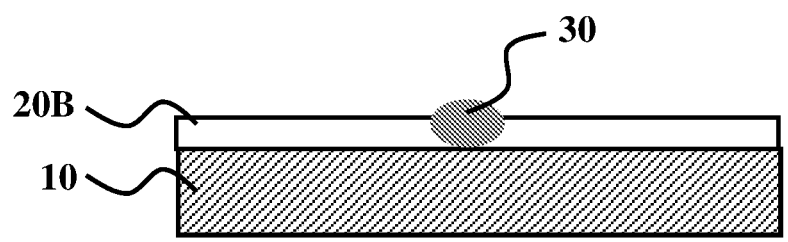
Figure 1C:
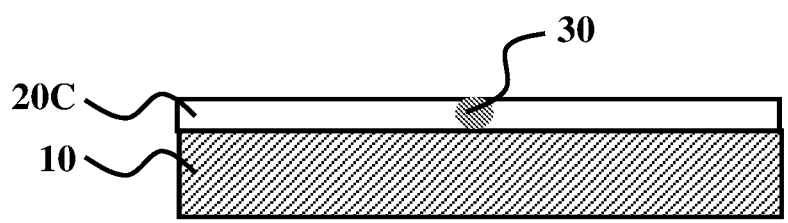

FIGS. 1A-1C illustrate schematically surfaces coated with a pre-coat layer, such that the properties of each pre-coat region determine the behavior of a droplet of a patterning formulation applied thereon.

Substrate 10 is coated by a region 20 of pre-coat layer. Regions 20A, 20B and 20C differ one from the other by at least one property, such as viscosity, degree of curing, thickness, tackiness, chemical composition, etc., such that a droplet of patterning formulation 30 that is applied onto the region either is maintained onto the pre-coat region, is partially embedded or completely submerged therein (FIGS. 1A, 1B an 1C, respectively).

Figure 2A:
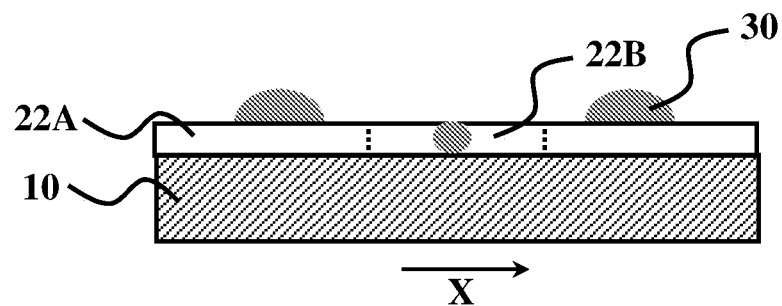
FIG. 2A show a schematic cross-section of an exemplary patterned surface having regions with different pre-coat formulations applied at different regions according to an embodiment of this disclosure.
Figure 2B:
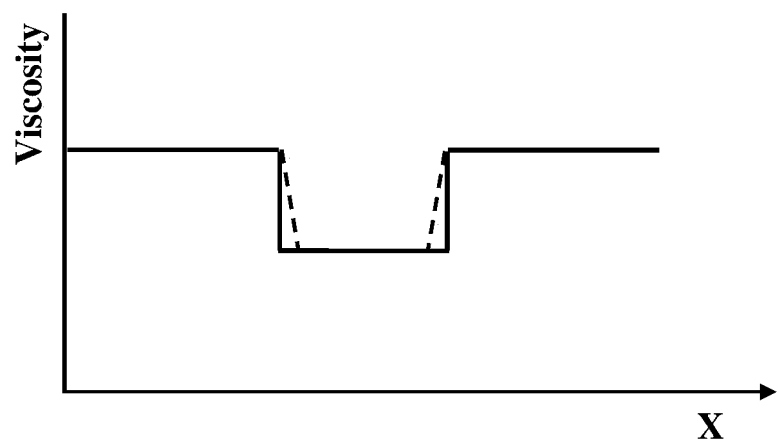
FIG. 2B shows the corresponding viscosity difference along the X direction.

As illustrated in FIG. 2A, the same substrate surface can be pre-coated with a plurality of regions of different pre-coat formulation (22A and 22B), the regions may be integral with one another, or spaced-apart (not shown). FIG. 2B shows an exemplary variance in viscosities of the pre-coat layer, corresponding to the printed regions in FIG. 2A; namely, in the region 22A the formulation provides a higher viscosity compared to that of region 22B.

Figure 3A:
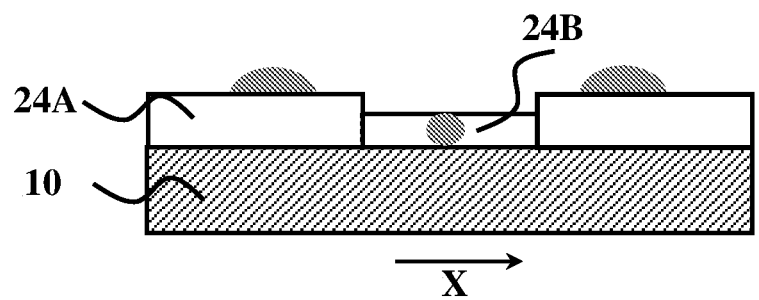
FIG. 3A show a schematic cross-section of an exemplary patterned surface having regions with the same pre-coat formulation applied at different thicknesses according to another embodiment of this disclosure.
Figure 3B:
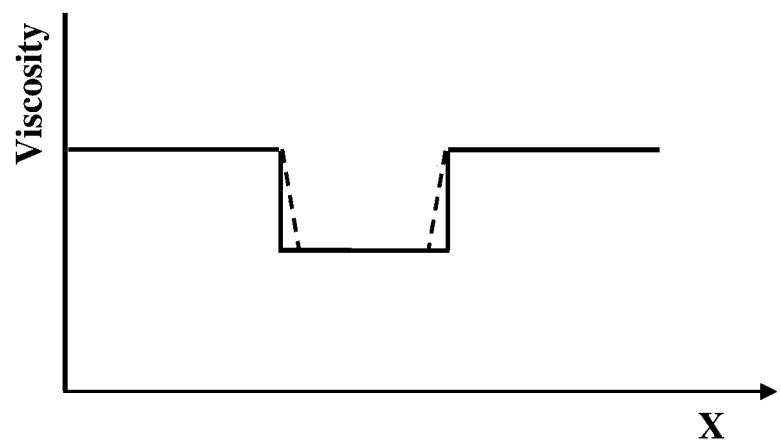
FIG. 3B shows the corresponding viscosity difference along the X direction.

FIG. 3A, shows another example of application of the pre-coat formulation. In this example, the substrate surface is pre-coated with a plurality of regions of the same pre-coat formulation, however, the regions differing in the pre-coating layer thickness (24A and 24B). In the corresponding viscosities shown in FIG. 3B, the thicker region (24A) will have a higher viscosity than that of the thinner region (24B).

The variance in properties in the pre-coat layer may also be obtained by applying at least two pre-coat formulations in a layered manner over the same region. Namely, in a given region, two or more pre-coat formulations may be applied on top of one another at a given ratio. The properties of different regions may be tuned by changing the ratios between the two pre-coat formulations, typically by changing the thickness of each pre-coat layer within a given region. For example, in one region a two pre-coat formulations may be applied at a thickness (or quantity) ratio of 20:80, while in an adjacent region the pre-coat formulations may be applied at a thickness (or quantity) ratio of 40:60 in order to obtain different properties in each such region. Another variation of properties may be obtained by reversing the order by which the pre-coat formulations are applied, namely, applying a first pre-coat formulation followed by a second pre-coat formulation, or applying a second pre-coat formulation followed by a first pre-coat formulation.

Figure 4A:
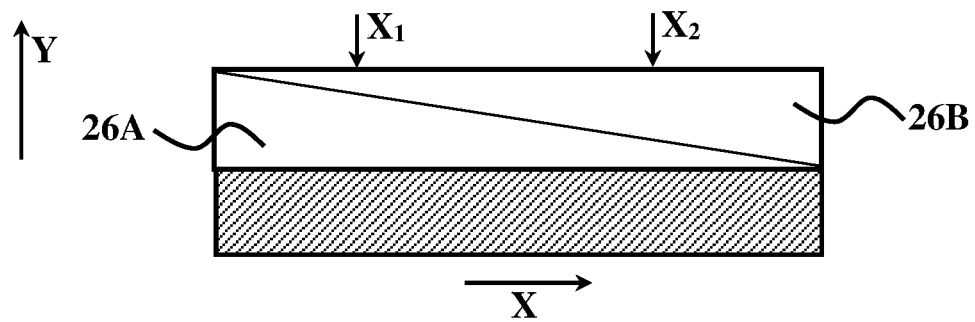
FIG. 4A show a schematic cross-section of an exemplary patterned surface having two layers of different pre-coat formulations, such that in each point along the X direction the ratio between the first and second pre-coat formulations ranges between 0:100% and 100%:0 according to another embodiment of this disclosure.
Figure 4B:
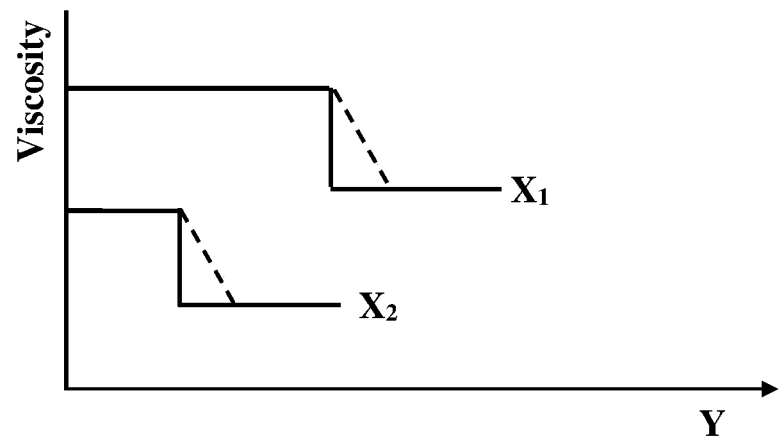
FIG. 4B shows the corresponding viscosity difference along the Y direction at two exemplary cross-sections when layer 26A contains more photo-initiator than layer 26B.
Figure 4C:
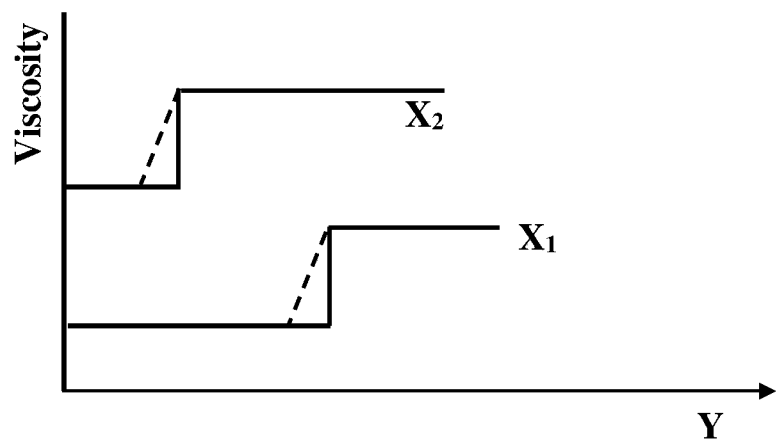
FIG. 4C shows the corresponding viscosity difference along the Y direction at two exemplary cross-sections when layer 26A contains more photo-initiator than layer 26B.

In another example, shown in FIG. 4A, at least two pre-coat formulations may be applied on top of the other, however resulting in a gradient of thicknesses in the X direction. Such a gradient may cause a continuous change in viscosities along the X direction; however, at any given point Xi, the viscosity along the Y direction also changes, depending on the local ratio between the formulations (FIGS. 4B-4C).

As a person of the art would appreciate, when the regions are integral with one another (as shown in FIGS. 2A, 3A and 4A), the point of contact between the different regions may actually be constituted by an interface region, in which any mixture of the pre-coat formulations may exist; this is shown in FIGS. 2B, 3B, 4B and 4C by dashed lines.

Effect of Pre-Coat Layer Thickness

As noted above, regions of pre-coat layer may differ from one another by at least one chemical and/or a physical property. For example, one of the differences may be the thickness of different pre-coat regions. Namely, the properties of the pre-coat formulation are such that, depending on the thickness of the pre-coat layer, a drop of patterning formulation applied onto the pre-coat layer will either at least partially penetrate the pre-coat layer or will be maintained on-top of the pre-coat layer.

Figure 5A:
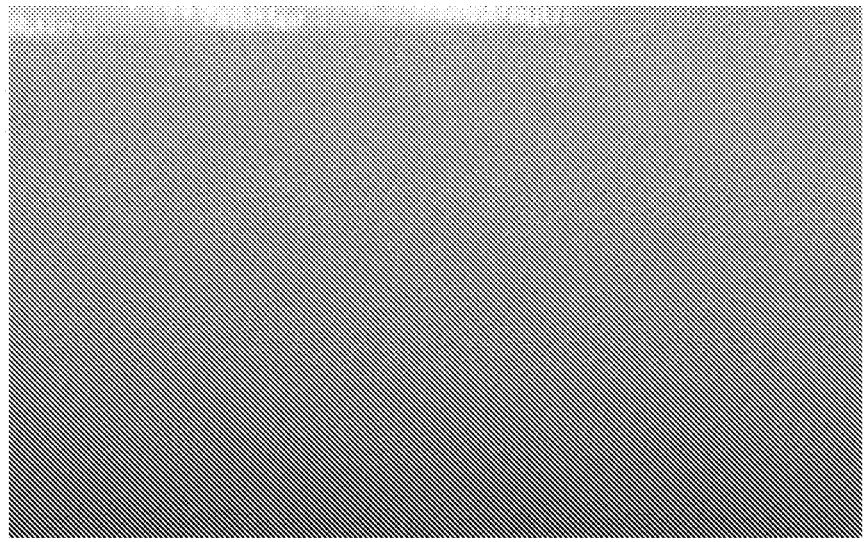
FIGS. 5A-5B show surfaces in which printing was carried out onto pre-coat layer having different thickness.
Figure 5B:
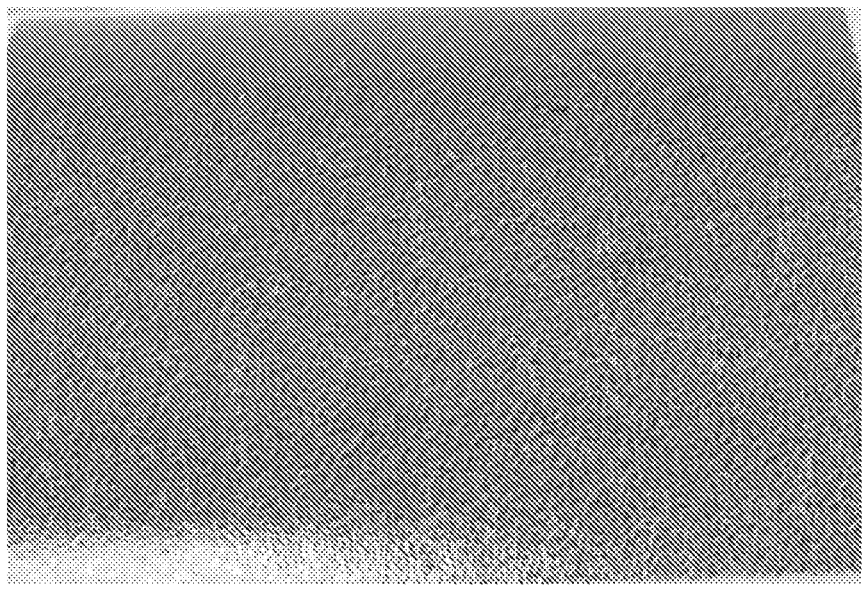

An example of this behavior of the pre-coat layer is provided in FIGS. 5A-5B. In FIG. 5A, a polymeric surface was first coated by a pre-coat formulation of this disclosure, providing a layer thickness of 5 microns, while in FIG. 5B the surface was coated with the same pre-coat formulation at a layer thickness of 10 microns. Both surfaces were exposed to the same irradiation source (395 nm) for an identical period of time to obtain partial curing of the pre-coat.

Then, the surfaces were printed with the same patterning formulation under identical printing and curing conditions. The surface seen in FIG. 5A showed a smooth surface texture, while the surface of FIG. 5B was grainy, with the drops of the patterning formulation protrude outwards from the surface.

Without wishing to be bound by theory, the first photoinitiator in the pre-coat formulation is sensitive to atmospheric oxygen and the polymerization process is often inhibited by exposure to oxygenation conditions. Therefore, in the thinner pre-coat layer of FIG. 5A, were the surface per volume of pre-coat layer is larger than the thicker layer of FIG. 5B.

The polymerization inhibition for the thinner layer is higher when the pre-coat layer is exposed to partial curing conditions. Namely, when exposed to the same partial curing conditions, the thin layer will result in a "softer" layer due to less polymerization, while in the thicker layer will result in a "harder" layer due to a larger extent of polymerization.

Therefore, in a method of printing according to the present disclosure, a layer of pre-coat may be formed with regions having different thickness. Such regions are exposed to partial curing conditions, in which a variance in curing degree is obtained. The behavior of the patterning formulation applied onto each of the layers, thus, depends on the properties of the pre-coat layer: in FIG. 5A, where the partially cured pre-coat layer is softer, the patterning formulation droplets penetrate the pre-coat layer, thereby resulting in a smooth surface; while in FIG. 5B, where the partially cured pre-coat layer is harder, the patterning formulation droplets are maintained on top of the surface, resulting in a textured surface.

In another example (not shown), identical polymeric surfaces coated by the same pre-coat formulation, with the thickness of the pre-coat layer on one surface being twice the thickness of the pre-coat layer of the other surface. Both samples were exposed to the same partial curing conditions (irradiation by a 395 nm LED lamp, 5 W/cm$^2$), and then patterning formulation droplets were applied onto the layers.

For the thinner—and thus less cured—pre-coat layer, the patterning formulation droplets were submerged in the pre-coat layer. For the thicker layer, which has a higher degree of partial curing, the patterning formulation droplets were maintained on top of the pre-coat layer. This variance in penetration of the patterning formulation, resulting from the variance of pre-coat properties at different regions allows utilizing the partial embedding of the droplets in the pre-coat layer for printing of smooth skin tones, pigment gradation effects, and spot areas over relatively large surfaces. In the harder pre-coat portions, where no substantial penetration of the patterning formulation into the pre-coat occurs, embossing effects, sharpness effect and fine lettering patterns may be obtained (as needed, for example, for sharp text and digits).

As explained, variance in the properties of the per-coat formulation assist in controlling the vertical position of the droplets (i.e. the depth of embedding within the pre-coat), as well as their degree of spreading. A "softer" surface allowed for substantially complete embedding of the patterning formulation into the pre-coat layer; the chemical reaction following the embedding of the droplet assisted in obtaining small patterning formulation dots within the pre-coat layer. A "harder" layer resulted in patterning formulation droplets within substantive penetration into the pre-cat layer, with a limited surface for contact between the formulations, hence assisting in spreading of the droplet onto the surface to obtain a larger coverage.

Text Printing

The variation and control of the properties of the pre-coat layer in each patterned surface region allows obtaining sharp images and text, which are hard to obtain in common printing methods.

Figure 6A:
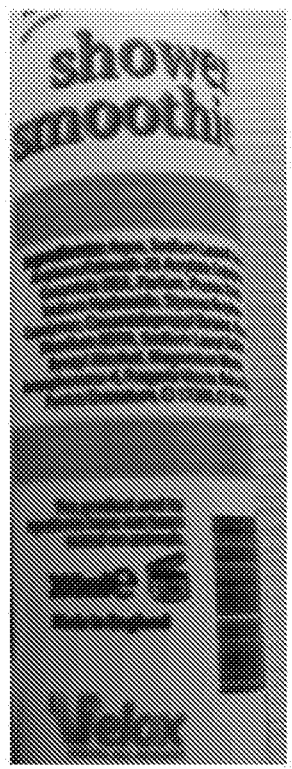
FIGS. 6A-6B show comparative printing quality of an image printed on a polymeric surface without a pre-coat formulation (FIG. 6A) and printed onto a pre-coat formulation in accordance with this disclosure (FIG. 6B).
Figure 6B:
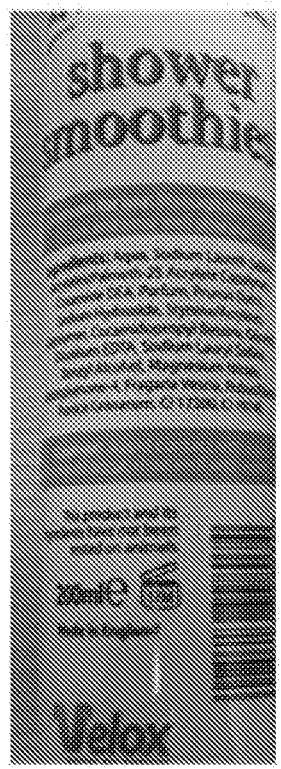

An exemplary surface containing image and text printed by methods according to this disclosure is shown in FIGS. 6A-6B. FIGS. 6A and 6B show comparative printing quality of an image comprising bar code, spot areas, logos and text printed on a polymeric surface. As can clearly be seen, the image printed by ink-jet onto a polymeric surface without a pre-coat demonstrates almost illegible digits, barcode and no borders at spot areas and logo (FIG. 6A). When the same surface, using the same inks (i.e. patterning formulations), was first coated by a pre-coat layer of the present disclosure and then printed with the same image, clear and sharp edges of the logo, spot area, barcode and the numerals was obtained (FIG. 6B). The methods of the present disclosure allow tailoring of the properties of the pre-coat of different regions in a selective manner allows providing different properties in regions intended for text from regions intended for image printing, thus enabling provision of sharp text and smooth image in a single and quick printing process.

In another example, FIGS. 7A and 7B show comparative printing quality of text on a polymeric surface. In this example, the surface to be printed was coated a gloss varnish, which is typically characterized by a very low surface energy and thus considered a problematic substrate for printing in common printing methods. Application of the pre-coat was carried out onto the gloss varnish, and the image was printed on top of the pre-coat layer in methods of the present disclosure.

Seen in FIG. 7A is the image when printed in a resolution of 800 dpi onto a pre-coat layer having a relatively high surface tension, similar to that of the patterning formulation. FIG. 7B is the same image in the same resolution, however the pre-coat formulation has a significantly (lower by at least 3 mN/m) compared to the surface tension of the patterning formulation. FIGS. 8A-8B are close-up images of a text portion of FIGS. 7A and 7B respectively.

As can clearly be seen, the low surface tension of the pre-coat formulation allowed for good coverage of the gloss varnished surface, providing a satisfactory basis for fixation of the patterning formulations printed thereonto in order to obtain sharp text and images (FIGS. 7B, 8B). In comparison, the sample in which surface tensions of the pre-coat and the pattering formulation was relatively similar (i.e. the difference between surface tensions being of less than 3 mN/m), no sharp contrast or detailed could be obtained when printing the image, while the printed text was characterized by uneven and/or hazy edges.

Printed Images

Figures 9A, 9B:
FIGS. 9A-9B provide an additional example of comparative printing quality of an image printed on a polymeric surface without a pre-coat formulation (FIG. 9A) and printed onto a pre-coat formulation in accordance with this disclosure (FIG. 9B).

The ability to obtain printing of smooth skin tones and pigment gradation effects over relatively large surfaces is exemplified in FIGS. 9A-9B. When printed without the pre-coat, the facial features of the model are blurry, and almost no color gradient is visible in the different facial areas (FIG. 9A); while when printing the same image on a surface first coated by a pre-coat formulation of this disclosure, the facial features are clear, with high resolution, color gradients and smooth skin tones are clearly visible (FIG. 9B).

Variable Depth Line-Pattern

Figure 10:
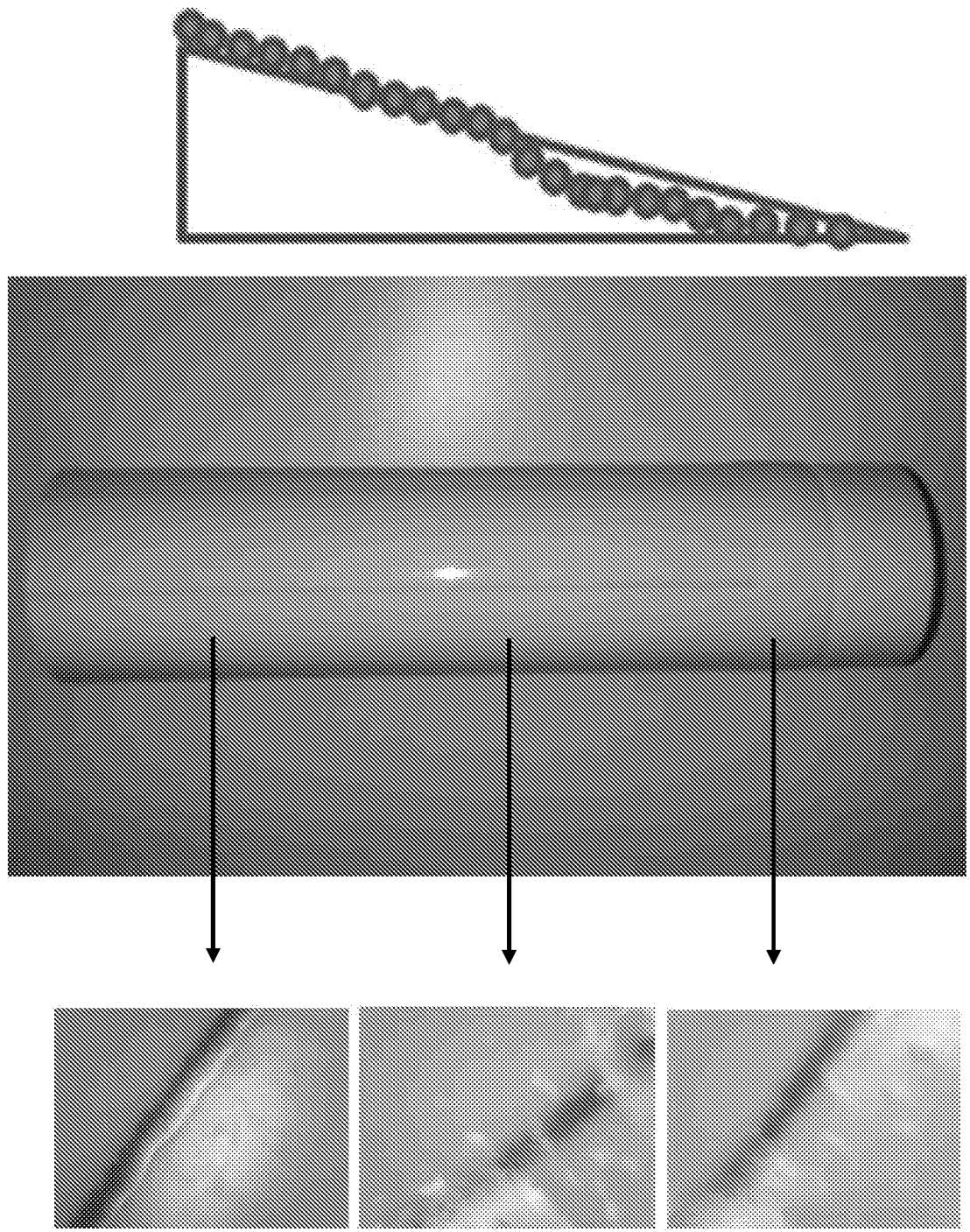
FIG. 10 shows a line pattern printed in a method of the present disclosure onto a pre-coat layer with a thickness of gradual variability.

A line pattern utilizing printing of a gradually thickness variable pre-coat layer is demonstrated in FIG. 10. The printing method was similar to that of Example 2, however, the pre-coat formulation was printed in a line pattern, which has gradually decreasing (from left to right) thickness. As can clearly be seen, the line of patterning formulation printed onto the gradually variable pre-coat layer resulted in a continuous line, characterized by two parts: one part being maintained on top of the pre-coat layer, while the other part being embedded within the pre-coat layer. Such lines patterns, when printed with conductive patterning formulations, may be utilized for printing layered integrated circuits or conductivity lines, such that a 3D architecture of the circuit may obtained by methods of the present disclosure.

Exemplary Printing Method (A)—Pre-Coat and Patterning

As noted above, a system of the present disclosure comprises at least a pre-coat formulation and patterning formulation(s). In a method according to the invention, a surface to be patterned, having a surface tension of above 30 mN/m, was provided.

The pre-coat formulation had a surface tension of 28 mN/m, and thus the drops of the pre-coat formulation spread to form a thin film onto the printed region of the surface.

The pre-coat formulation was clear (i.e. transparent), and included acidic acrylic oligomers.

In order to increase the viscosity of the pre-coat layer, the surface was exposed to irradiation at a wavelength of 395 nm, such that a suitable photo-initiator present in the pre-coat formulation was activated, to thereby cause partial polymerization and thickening of the pre-coat layer. Due this exposure, the pre-coat layer's viscosity increased to ~100,000 cps, resulting in a sticky layer. Non-limiting examples for such photo-initiators may be piperazin-based aminoalkylphenone (Omnipol 910), di-ester of carboxymethoxy thioxanthone and polytetramethyleneglycol (Omnipol TX), bis(2,4,6-trimethylbenzoyl)phenylphosphine oxide (irgacure 819) or 4-hydroxylbenzophenone laurate (Omnirad 4HBL). The pre-coat formulation further comprised a second, UV-light sensitive photo-initiator, which was not activated at this stage.

Then, between 4 and 12 different patterning formulations, differing in their pigments, were jet-printed onto the viscous pre-coat layer, one after the other. No curing, drying or pining was carried out in between printing of different patterning formulations. Each of the patterning formulations comprised an acryl amine monomer or oligomer and a UV-light sensitive photo-initiator, and had a surface tension of about 31-35 mN/m. Thus, droplets of the patterning formulations, having a viscosity of about 25 cps, applied onto the pre-coat layer, underwent an acid-base chemical reaction (i.e. a reaction between the carboxylic groups of the acidic acrylic monomer or oligomer of the pre-coat and the basic amine groups of the acryl amine monomer or oligomer in the patterning formulations). The chemical reaction increased the viscosity of the patterning formulations drops to about 100,000 cps, thereby enabling their fixation. The difference between surface tensions prevented the undesired bleeding or mixing of colors, resulting in good separation and color-resolution.

Upon completion of printing, the patterned area was exposed to UV irradiation at a wavelength of 200-470 nm, thereby activating the UV-light sensitive photo-initiators in the pre-coat and the patterning formulations, to cause curing of the entire printed pattern at a single curing process.

Exemplary Printing Method (B)—Pre-Coat, Intermediate-Coat and Patterning

Other systems according to the present disclosure may comprise a pre-coat formulation, an intermediate-coat formulation and patterning formulation(s). In a method according to the invention, a surface to be patterned, having a surface tension of above 30 mN/m, was provided.

The pre-coat formulation had similar composition, surface tension and viscosity as described in Exemplary method (A). After application of the pre-coat layer, the surface was exposed to irradiation at a wavelength of 395 nm, such that a suitable photo-initiator present in the pre-coat formulation was activated, to thereby cause partial polymerization and thickening of the pre-coat layer. Due this exposure, the pre-coat layer's viscosity increased to ~100,000 cps, resulting in a sticky layer. The pre-coat formulation further comprised a second, UV-light sensitive photo-initiator, which was not activated at this stage.

An intermediate-coat formulation, comprising a white pigment and an acidic acrylic oligomer was jet printed onto the pre-coat layer. The intermediate-coat has a surface tension of about 32 mN/m; thus, enabling the printing of a desired intermediate pattern onto the pre-coat layer. Upon application, the intermediate-coat had a viscosity of about 100 cps, and exposure to irradiation at a wavelength of 395 nm activated a suitable photo-initiator in order to increase the viscosity of the intermediate-coat to ~100,000 cps. The pre-coat formulation further comprised a second, UV-light sensitive photo-initiator, which was not activated at this stage.

Then, between 4 and 12 different patterning formulations, differing in their pigments, were jet-printed onto the viscous intermediate-coat layer, one after the other. No curing or drying was carried out in between printing of different patterning formulations. Each of the patterning formulations comprised an acryl amine monomer or oligomer and a photo-initiator, and had a surface tension of about 32-35 mN/m. Thus, droplets of the patterning formulations, having a viscosity of about 25 cps, applied onto either the pre-coat or the intermediate-coat pattern layer, underwent an acid-base chemical reaction (i.e. a reaction between the carboxylic groups of the acidic acrylic monomer of the pre-coat and intermediate formulations and the basic amine groups of the acryl amine monomer or oligomer in the patterning formulations). The chemical reaction increased the viscosity of the patterning formulations drops to about 100,000 cps, thereby enabling their fixation. The difference between surface tensions prevented the undesired bleeding or mixing of colors, resulting in good separation and color-resolution.

Upon completion of printing, the patterned area was exposed to UV irradiation at a wavelength of 200-470 nm, thereby activating the UV-sensitive photo-initiators and curing the entire printed pattern at a single curing process.

Embodiments

1. A printing pre-coat formulation comprising at least one functionalized monomer, at least one oligomer, at least one surfactant, at least one first photo-initiator activatable by a first wavelength and at least one second photo-initiator activatable by a second wavelength.

2. The formulation of embodiment 1, having a surface tension of at most 37 mN/m.

3. The formulation of embodiment 1 or 2, having a surface tension of between about 20 mN/m and 33 mN/m.

4. The formulation of any one of embodiments 1 to 3, having a viscosity of at least 50 cps at ambient temperature.

5. The formulation of any one of claims 1 to 4, wherein the at least one monomer is selected from methylacrylate (MA), methylmethacrylate (MMA), ethylacrylate, (ethylhexyl)acrylate, hydroxyethyl methacrylate, butylacrylate, butylmethacrylate, trimethylolpropane triacrylate (TMPTA), tri-ethoxy triacrylate (TMP(EO)$_3$TA), isobornyl acrylate (IBOA), dipropylene glycol diaacrylate (DPGDA) and combinations thereof.

6. The formulation of any one of embodiments 1 to 5, wherein said at least one monomer is present in said formulation in a concentration of between about 15 to about 70 wt %.

7. The formulation of any one of embodiments 1 to 6, wherein at least one oligomer is selected from epoxy acrylates, polyester acrylate, acrylic acrylate, urethane acrylate and combinations thereof.

8. The formulation of any one of embodiments 1 to 7, wherein said at least one oligomer is present in said formulation in a concentration of between about 5 and 50 wt %.

9. The formulation of any one of embodiments 1 to 8, wherein the at least one monomer is functionalized by a reactive group selected from an acidic group, a basic group, or a complexation ligand.

10. The formulation of embodiment 9, wherein (i) said reactive group is an acidic group, selected from carboxyl groups, sulfonic acid groups (SO$_2$OH), thiols, and enols; or (ii) said chemically reactive group is a basic group, selected from primary amines, secondary amines, tertiary amines, hydroxyl groups, and amides.

11. The formulation of any one of embodiments 1 to 10, wherein the at least one oligomer is functionalized by a reactive group.

12. The formulation of embodiment 11, wherein said reactive group is selected from an acidic group, a basic group, or a complexation ligand.

13. The formulation of embodiment 12, wherein (i) said reactive group is an acidic group, selected from carboxyl groups, sulfonic acid groups (SO$_2$OH), thiols, and enols; or (ii) said chemically reactive group is a basic group, selected from primary amines, secondary amines, tertiary amines, hydroxyl groups, and amides.

14. The formulation of any one of embodiments 1 to 13, further comprising at least one other oligomer, optionally selected from epoxy acrylates, polyester acrylate, acrylic acrylate, urethane acrylate, and combinations thereof.

15. The formulation of embodiment 12 or 13, wherein said at least one other oligomer is present in said formulation in a concentration of between about 5 and 15 wt %.

16. The formulation of any one of embodiments 14 or 15, wherein the at least one other oligomer is functionalized by a reactive group selected from an acidic group, a basic group, or a complexation ligand.

17. The formulation of embodiment 16, wherein (i) said reactive group is an acidic group, selected from carboxyl groups, sulfonic acid groups (SO$_2$OH), thiols, and enols; or (ii) said reactive group is a basic group, selected from primary amines, secondary amines, tertiary amines, hydroxyl groups, and amides.

18. The formulation of any one of embodiments 16 or 17, wherein at least one of the at least one oligomer and the at least one other oligomer are functionalized.

19. The formulation of embodiment 18, wherein both the at least one oligomer and the at least one other oligomer are functionalized, carrying the same or different functional groups.

20. The formulation of any one of embodiments 1 to 19, wherein said at least one surfactant is selected from a siliconic polymer, a silico-organic polymer, acrylate modified siloxanes, and fluoroacrylate modified siloxanes.

21. The formulation of any one of embodiments 1 to 20, wherein said at least one surfactant is present in said formulation in a concentration of between about 0.01 and 4 wt %.

22. The formulation of any one of embodiments 1 to 21, wherein said at least one first photo-initiator is selected from bis(2,4,6-trimethylbenzoyl)-phenylphosphineoxide piperazin-based aminoalkylphenone, di-ester of carboxymethoxy thioxanthone and polytetramethyleneglycol, bis(2,4,6-trimethylbenzoyl)phenylphosphine oxide and 4-hydroxylbenzophenone laurate. Please add polymeric PI from the same kind you mentioned above 23. The formulation of any one of embodiments 1 to 22, wherein said at least one first photo-initiator is present in said formulation in a concentration of between about 0.1 and 2 wt %.

24. The formulation of embodiment 22 or 23, wherein said first wavelength is between about 365 nm and about 470 nm.

25. The formulation of any one of embodiments 1 to 24, wherein said at least one first photo-initiator is activatable by exposure to said first wavelength to causes increase of the viscosity of the formulation to at least 100 cps, at least 1,000 cps, at least 10,000 cps or at least 100,000 cps.

26. The formulation of any one of embodiments 1 to 25, wherein said at least one second photo-initiator is selected from 1-[4-(2-hydroxyethoxy)-phenyl]-2-hydroxy-2-methylpropanone, 1-hydroxycyclohexylphenylketone, hydroxyketones, methyl-o-benzoylbenzoate, 4-(4-methylphenylthio)benzophenone, and 2-benzyl-2-(dimethylamino)-4'-morpholinobutyrophenone.

27. The formulation of any one of embodiments 1 to 26, wherein said at least one second photo-initiator is present in said formulation in a concentration of between about 3 and 10 wt %.

28. The formulation of embodiment 26 or 27, wherein said second wavelength is between about 200 nm and about 470 nm.

29. The formulation of any one of embodiments 1 to 28, wherein said at least one second photo-initiator is activatable by exposure to said second wavelength to causes polymerization of said at least one monomer, optionally at least one oligomer and/or at least one other oligomer.

30. The formulation of any one of embodiments 1 to 29, wherein said first photo-initiator is a first moiety of an agent, said first moiety being activatable by said first wavelength.

31. The formulation of embodiment 30, wherein said second photo-initiator is a second moiety of said agent, said second moiety being activatable by said second wavelength.

32. The formulation of any one of embodiments 1 to 31, further comprising at least one of a pigment, a diluent, a polymer, an adhesion modifier, a free-radical scavenger, and a viscosity modifier.

33. The formulation of embodiment 32, wherein the diluent is selected from at least one an optionally substituted aliphatic diluent, at least one an optionally substituted aromatic diluent, an acrylic acid ester, and mixtures thereof.

34. The formulation of embodiment 33, wherein said diluent is an acrylic acid ester monomer.

35. The formulation of embodiment 33 or 34, wherein said diluent is present in the formulation in an amount of 25-30 wt %.

36. The formulation of any one of embodiments 32 to 35, wherein said pigment is selected from a chromophore, a salt, an encapsulated pigment powder, thermochromic pigments, fluorescent pigments, security tagging agents, inorganic pigments, metallic particles, magnetic particles, conductive pigments, and organic pigments.

37. The formulation of any one of embodiments 1 to 36, being substantially devoid of volatile solvents.

38. A substrate for printing comprising a surface, being pre-coated on at least a portion of the surface by a layer of pre-coat formulation of any one of embodiments 1 to 36.

39. The substrate of embodiment 38, wherein said formulation is substantially depleted from the first activatable photo-initiator once exposed to irradiation of said first wavelength.

40. The substrate of embodiment 39, wherein the viscosity of the formulation is at least 100 cps, at least 1,000 cps, at least 10,000 cps or at least 100,000 cps.

41. A method of preparing a surface for printing, comprising:
applying a pre-coat formulation of any one of embodiments 1 to 37 onto at least a portion of the surface; and
exposing the surface to irradiation at a first wavelength to activate at least one first photo-initiator in the pre-coat formulation, such that the viscosity of the formulation increases by at least an order of magnitude compared to its initial viscosity, to obtain a pre-coated surface.

42. The method of embodiment 41, further comprising applying a removable layer onto the viscosified pre-coat.

43. A method for printing a pattern onto a substrate, comprising:
applying a pre-coat formulation of any one of embodiments 1 to 37 onto at least a portion of the substrate's surface;
exposing the surface to irradiation at a first wavelength to activate at least one first photo-initiator in the pre-coat formulation;
applying at least one patterning formulation onto at least a region of said portion; and
exposing said surface to irradiation at a second wavelength to activate at least one second photo-initiator in the pre-coat formulation.

44. A method for printing a pattern onto a substrate, comprising:
applying a pre-coat formulation of any one of embodiments 1 to 37 onto at least a portion of the substrate's surface;
exposing the surface to irradiation at a first wavelength to activate at least one first photo-initiator in the pre-coat formulation;
applying at least one patterning formulation onto at least a region of said portion, such that said at least one patterning formulation comprising a complementary reactive group being capable of chemically reacting with a reactive group in said pre-coat formulation; and
exposing said surface to irradiation at a second wavelength to activate at least one second photo-initiator in the pre-coat formulation.

45. The method of any one of embodiments 41 to 44, wherein the initial viscosity of the pre-coat formulation is increased by at least an order of magnitude by said exposure to irradiation at said first wavelength.

46. The method of embodiment 45, wherein the pre-coat formulation has a viscosity of at least 10 cps before exposure to said irradiation, and a viscosity of at least 1,000 cps after such exposure.

47. The method of any one of embodiments 44 to 46, wherein (i) said reactive group is an acidic functional group and said complementary reactive group is a basic functional group, or (ii) said reactive group is a basic functional group and said complementary reactive group is an acidic functional group.

48. The method of any one of embodiments 44 to 47, wherein said at least one patterning formulation has a surface tension larger by at least 3 mN/m compared to the pre-coat formulation.

49. The method of any one of embodiments 44 to 48, wherein the pre-coat formulation is applied onto a plurality of portions, such that at least one of said portions being coated by pre-coat of a first thickness and at least one other of said portions being coated by pre-coat of a second thickness, said second thickness being larger than said first thickness.

50. The method of embodiment 49, wherein patterning formulation applied onto said first thickness portions is at least partially embedded within said pre-coat, and patterning formulation applied onto said second thickness portions is maintained on top of the pre-coat.

51. A method for patterning a surface, the method comprising
patterning at least one pre-coat formulation on a surface region to form patterned regions, at least two of said patterned regions differing from each other in at least one of a chemical and a physical property;
exposing the pre-coat formulation to conditions permitting partial curing of the pre-coat formulation;
applying at least one patterning formulation onto said patterned region(s), wherein the at least one patterning formulation applied onto said patterned region interacts with the pre-coat formulation, the interaction between the patterning formulation and the pre-coat formulation being determined by said chemical and physical properties, such that (i) the patterning formulation is at least partially embedded within said pre-coat, or (ii) the patterning formulation is maintained on top of the pre-coat; and
exposing the surface to conditions permitting completion of curing of the pre-coat and the patterning formulations, thereby obtaining a patterned surface.

52. The method of embodiment 51, wherein the pre-coat formulation is transparent.

53. The method of embodiment 51 or 52, wherein said chemical or physical property differing between at least two of said patterned regions is at least one of composition, degree of curing, viscosity, tackiness, surface structure, surface tension, thickness of the patterned region, chemical reactivity, and pH.

54. The method of embodiment 53, wherein said chemical or physical property is the composition of the patterned region.

55. The method of embodiment 54, wherein each of the at least two patterned regions comprises at least one photo-initiator.

56. The method of embodiment 55, wherein each of the at least two patterned regions comprises a different photo-initiator.

57. The method of embodiment 55, wherein each of the at least two patterned regions comprises a different amount of photo-initiator.

58. The method of embodiment 55, wherein each of the at least two patterned regions comprises a different combination of photo-initiators.

59. The method of any one of embodiments 55-58, wherein the patterned regions comprise at least two photo-initiators.

60. The method of embodiment 59, wherein a first of said at least two photo-initiators causes said partial curing of the pre-coat formulations when exposed to irradiation in a first wavelength.

61. The method of embodiment 59 or 60, wherein a second of said at least two photo-initiators causes said completion of curing of the pre-coat formulation upon exposure to irradiation in a second wavelength.

62. The method of any one of embodiments 51 to 61, wherein at least two of said patterned regions differ in their degree of curing.

63. The method of embodiment 62, wherein said difference is degree of curing is obtained by exposing the patterned region(s) to conditions permitting partial curing.

64. The method of embodiment 51 to 63, wherein said conditions permitting partial curing are selected from exposure to irradiation with a radiation source of a defined band/wavelength, exposure to a magnetic source, exposure to electrical fields, irradiation by an electron beam, dark curing, exposure to IR radiation, or exposure to high or low temperatures.

65. The method of any one of embodiments 51 to 64, wherein at least two of said patterned regions differ in their viscosity.

66. The method of embodiment 65, wherein said different in viscosity is obtained by different degrees of curing.

67. The method of any one of embodiments 51 to 66, wherein at least two of said patterned regions differ in their surface structure.

68. The method of embodiment 67, wherein said difference in surface structure is obtained by said partial curing.

69. The method of any one of embodiments 51 to 68, wherein at least two of said patterned regions differ in their thickness.

70. The method of embodiment 69, wherein said at least two patterned regions comprise (a) at least one first region coated by pre-coat of a first thickness and (b) at least one second region coated by pre-coat of a second thickness, said second thickness being larger than said first thickness, such that (i) patterning formulation applied onto said first region after said partial curing is at least partially embedded within said pre-coat and (ii) patterning formulation applied onto said second region is maintained on top of the pre-coat.

71. The method of embodiment 70, wherein the second thickness is larger by at least 5% from said first thickness.

72. The method of embodiment 70, wherein said at least one first and at least one second regions are integral one with the other and form a line pattern of pre-coat formulation.

73. The method of embodiment 72, wherein said line pattern having a gradually increasing or a gradually decreasing thickness along the line pattern.

74. The method of any one of embodiments 51 to 68, wherein said pre-coat layer is obtained by patterning a first sub-layer of a first pre-coat formulation and a second sub-layer applied thereonto of a second, different, pre-coat formulation, such that said at least two regions differ from each other in the ratio between the first and second sub-layers.

75. The method of embodiment 74, wherein the ratio of said first sub-layer to said second-sub-layer in each of said at least two regions is independently in the range of between 0:100% and 100%:0.

76. The method of any one of embodiments 51 to 75, wherein said patterned regions are integrally formed one with the other.

77. The method of any one of embodiments 51 to 76, wherein said at least one patterning formulation comprises a pigment.

78. The method of any one of embodiments 51 to 77, wherein said at least one pre-coat formulation comprises an agent being capable of chemically reacting with a complementary agent in said at least one patterning formulation.

79. The method of embodiment 78, wherein said agent is an acid or an acidic moiety and said complementary agent is a base or a basic moiety.

80. The method of any one of embodiments 51 to 79, further comprising, prior to applying at least one patterning formulation, application of at least one intermediate formulation.

81. The method of embodiment 80, wherein the intermediate formulation comprises at least one white pigment.

82. The method of embodiment 80 or 81, wherein said at least one intermediate formulation comprises an agent being capable of chemically reacting with a complementary agent in said at least one patterning formulation.

83. The method of any one of embodiments 51 to 82, wherein said surface is convex.

84. A patterned article, comprising:
an article having a surface;
a pre-coat layer on a region of said surface, the pre-coat layer forming patterned regions, at least two of said patterned regions differing from each other in at least one of a chemical and a physical property; and
at least one layer of a patterning formulation being in interaction with the pre-coat layer, the interaction between the patterning formulation layer and the pre-coat layer being determined by said chemical and physical properties, such that the patterning formulation layer being (i) at least partially embedded within said pre-coat layer, or (ii) maintained on top of the pre-coat layer.

85. The patterned article of embodiment 84, further comprising a layer of intermediate composition, disposed onto said pre-coat layer, and interacting with said pre-coat layer, such that the intermediate formulation layer being (i) at least partially embedded within said pre-coat layer, or (ii) maintained on top of the pre-coat layer.

86. The article of embodiment 85, wherein said intermediate layer comprises white pigment.

87. A patterned article, comprising, comprising:
an article having a surface;
a pre-coat layer onto said surface, the pre-coat layer having at least one first region of a first thickness and at least one second region of a second thickness, said second thickness being larger than said first thickness; and at least one pattern layer of a patterning formulation, being (i) at least partially embedded within said first regions and (ii) on top of said second regions of the pre-coat layer.

88. The article of embodiment 87, wherein the second thickness is larger by at least 5% from said first thickness.

89. The article of any one of embodiments 84 to 88, wherein said patterned regions are integrally formed one with the other.

90. The article of any one of embodiments 84 to 89, wherein the pre-coat layer is transparent.

91. The article of any one of embodiments 84 to 90, wherein said at least one patterning formulation comprises a pigment.

92. The article of any one of embodiments 84 to 91, wherein said surface is convex.

93. A method forming a line pattern onto a surface, comprising:

forming onto at least a portion of the surface a layer of pre-coat formulation, the layer having a thickness of gradual variability, such that at least one first region of the layer having a thickness smaller by at least 5% from at least one second region of the layer;

exposing said layer to conditions permitting partial curing of the pre-coat formulation onto the surface;

applying at least one line of at least one patterning formulation onto said layer such that (i) patterning formulation applied onto said first region becomes at least partially embedded within said layer and (ii) patterning formulation applied onto said second region is maintained on top of said second region to obtain a pre-cured line pattern; and exposing said at pre-cured line pattern to conditions permitting completion of curing thereby obtaining a line pattern onto said surface.

94. The method of embodiment 93, wherein said pre-coat layer having a gradually increasing or a gradually decreasing thickness along the line pattern.

95. The method of embodiment 93 or 94, wherein the patterning formulation comprises a pigment, conductive particles, or combinations thereof.

96. A patterned article, comprising:
an article having a surface;
a pre-coat layer on said surface, the pre-coat layer having gradual variability of at least one chemical or physical property along a defined direction; and
at least one line a patterning formulation, wherein said patterning formulation being (i) at least partially embedded within first regions of the pre-coat layer and (ii) on top of second regions of the pre-coat layer, the first and second regions being integral one with the other.

97. A patterned article, comprising:
an article having a surface;
a pre-coat layer having a thickness of gradual variability onto said surface, such that at least one first region of the layer having a thickness smaller by at least 5% from at least one second region of the layer; and
at least one line a patterning formulation, wherein said patterning formulation being (i) at least partially embedded within said first regions and (ii) on top of said second regions of the pre-coat layer.

98. The article of embodiment 96, wherein said layer having a gradually increasing or a gradually decreasing thickness along the line pattern.

99. A printing-ink system comprising a pre-coat formulation having a surface tension $\gamma_0$, and at least one patterning formulation having a surface tension $\gamma_2$, such that $\gamma_0 < \gamma_2$ at ambient conditions; the at least one patterning formulation comprising an agent being capable of chemically reacting with a complementary agent in the pre-coat formulation.

100. The system of embodiment 99, wherein the chemical reaction between said agent and said complementary agent increases the viscosity of said at least one patterning formulation.

101. The system of embodiment 100, wherein said at least one patterning formulation has an initial viscosity $\mu_2^0$ and upon chemical reaction between said agent and said complementary agent the viscosity of the at least one patterning formulation increases by at least an order of magnitude to a viscosity $\mu_2$.

102. The system of embodiment 101, wherein $\mu_2^0$ is at least 10 cps, at least 50 cps or at least 100 cps, and/or $\mu_2$ is at least 1,000, at least 10,000 cps or at least 100,000 cps.

103. The system of any one of embodiments 99 to 102, wherein said at least one patterning formulation comprises a pigment, optionally wherein the system comprises 2 or more patterning formulations, each comprising a different pigment.

104. The system of any one of embodiments 99 to 103, wherein said agent is a polymer, oligomer or monomer, each functionalized with basic functional groups.

105. The system of embodiment 104, wherein said polymer or oligomer is selected from polymethylacrylate (PMA), polymethylmethacrylate (PMMA), polyethylacrylate, poly(ethylhexyl)acrylate, polyhydroxyethyl methacrylate, polybutylacrylate, polybutylmethacrylate, Trimethylolpropane triacrylate (TMPTA), tri-ethoxy triacrylate (TMP(EO)3TA), epoxy acrylates, polyester acrylate, urethane acrylate, acrylated oligoamine resin, or an amine modified acrylate; or said monomer is selected from methylacrylate (MA), methylmethacrylate (MMA), ethylacrylate, (ethylhexyl)acrylate, hydroxyethyl methacrylate, butylacrylate, butylmethacrylate, Trimethylolpropane triacrylate (TMPTA), tri-ethoxy triacrylate (TMP(EO)3TA), epoxy acrylate monomer, polyester acrylate monomer, urethane acrylate monomer, and any combination thereof.

106. The system of embodiment 104 or 105, wherein said basic functional groups are selected from primary amines, secondary amines, tertiary amines, hydroxyl groups, and amides.

107. The system of any one of embodiments 99 to 106, wherein said complementary agent is a polymer, oligomer or monomer, each functionalized with acidic functional groups.

108. The system of embodiment 107, wherein said polymer or oligomer is selected from polymethylacrylate (PMA), polymethylmethacrylate (PMMA), polyethylacrylate, poly(ethylhexyl)acrylate, polyhydroxyethyl methacrylate, polybutylacrylate, polybutylmethacrylate, Trimethylolpropane triacrylate (TMPTA), tri-ethoxy triacrylate (TMP(EO)3TA), epoxy acrylates, chlorinated polyester acrylate, polyacrylic acid, acid functional acrylate, acid functional methacrylate; or said monomer is selected from their corresponding monomers.

109. The system of embodiment 107 or 108, wherein said acidic functional groups are selected from carboxyl groups, sulfonic acid groups (—$SO_2OH$), thiols, and enols.

110. The system of any one of embodiments 99 to 109, wherein the surface tension $\gamma_0$ is at most 37 mN/m.

111. The system of any one of embodiments 99 to 110, wherein the surface tension $\gamma_0$ is between about 20 and 33 mN/m.

112. The system of any one of embodiments 99 to 111, wherein the surface tension $\gamma_2$ is larger than $\gamma_0$ by at least 3 mN/m.

113. The system of any one of embodiments 99 to 112, wherein each of the pre-coat formulation and the at least one patterning formulation independently comprises at least one photo-initiator.

114. The system of embodiment 113, wherein said photo-initiator is UV-sensitive, optionally activated at a wavelength of between about 365 nm and 470 nm.

115. The system of embodiment 113, wherein said photo-initiator is activated upon exposure to irradiation in a wavelength of between 200 and 470 nm.

116. The system of any one of embodiments 99 to 115, further comprising an intermediate formulation having a surface tension $\gamma_1$, such that $\gamma_0 < \gamma_1 \leq \gamma_2$ at ambient conditions.

117. The system of embodiment 116, wherein the intermediate formulation comprises at least one other pigment, optionally said at least one other pigment is different from the pigment of the patterning formulation.

118. The system of embodiment 116 or 117, wherein said agent being capable of chemically reacting with one other complementary agent in the intermediate formulation.

119. The system of embodiment 118, wherein the chemical reaction between said agent and said at least one other complementary agent increases the viscosity of said at least one patterning formulation.

120. The system of embodiment 119, wherein said at least one patterning formulation has an initial viscosity $\mu_2^0$ and upon chemical reaction between said agent and said other complementary agent, the viscosity of the at least one patterning formulation increases by at least an order of magnitude to a viscosity $\mu_2$.

121. The system of any one of embodiments 118 to 120, wherein said other complementary agent is a polymer, oligomer or monomer functionalized with basic functional groups.

122. The system of embodiment 121, wherein said polymer or oligomer is selected from polymethylacrylate (PMA), polymethylmethacrylate (PMMA), polyethylacrylate, poly(ethylhexyl)acrylate, polyhydroxyethyl methacrylate, polybutylacrylate, polybutylmethacrylate, Trimethylolpropane triacrylate (TMPTA), tri-ethoxy triacrylate (TMP(EO)3TA), epoxy acrylates, polyester acrylate, urethane acrylate, acrylated oligoamine resin, or an amine modified acrylate; or said monomer is selected from methylacrylate (MA), methylmethacrylate (MMA), ethylacrylate, (ethylhexyl)acrylate, hydroxyethyl methacrylate, butylacrylate, butylmethacrylate, Trimethylolpropane triacrylate (TMPTA), tri-ethoxy triacrylate (TMP(EO)3TA), epoxy acrylate monomer, polyester acrylate monomer, urethane acrylate monomer, and any combination thereof.

123. The system of embodiment 121 or 122, wherein said acidic functional groups are selected from primary amines, secondary amines, tertiary amines, hydroxyl groups, and amides.

124. The system of any one of embodiments 116 to 123, wherein the surface tension $\gamma_1$ is larger than $\gamma_0$ by at least 3 mN/m.

125. The system of any one of embodiments 116 to 124, wherein the intermediate formulation further comprises at least one photo-initiator, said photo-initiator being optionally activated at a wavelength of between 365 and 470 nm.

126. The system of any one of embodiments 99 to 125, wherein each of the pre-coat formulation and the at least one patterning formulation independently comprises at least one of a diluent, a surfactant, a surface-tension modifier, a free-radical scavenger, and a viscosity modifier.

127. The system of any one of embodiments 116 to 126, wherein the intermediate formulation comprises at least one of a diluent, a surfactant, a surface-tension modifier, a free-radical scavenger, and a viscosity modifier.

128. The system of any one of embodiments 99 to 127, wherein each of the pre-coat formulation and the at least one patterning formulation are substantially solvent free.

129. The system of any one of embodiments 116 to 128, wherein the intermediate formulation is substantially solvent free.

130. A printing-ink system comprising
a pre-coat formulation having a surface tension $\gamma_0$;
an intermediate formulation having a surface tension $\gamma_1$; and
at least one patterning formulation having a surface tension $\gamma_2$;
such that $\gamma_0 < \gamma_1 \leq \gamma_2$ at ambient conditions.

131. The system of embodiment 130, wherein each of the pre-coat formulation, the intermediate formulation and the at least one patterning formulation being substantially free of solvent.

132. The system of embodiment 130 or 131, wherein said patterning formulation comprising at least one pigment and said intermediate formulation comprises at least one other pigment, optionally wherein said at least one pigment being different from said at least one other pigment.

133. The system of any one of embodiments 130 to 132, wherein the at least one patterning formulation comprises an agent being capable of chemically reacting with at least one of (i) a complementary agent in at least one of the pre-coat formulation and (ii) at least one other complementary agent in the intermediate formulation, said complementary agent and said other complementary agent may be the same or different.

134. The system of embodiment 133, wherein each of said complementary agent and said other complementary agent is independently a polymer, oligomer or monomer functionalized with acidic functional groups, and said agent is a polymer, oligomer or monomer functionalized with basic functional groups.

135. The system of any one of embodiments 130 to 134, wherein the surface tension $\gamma_0$ is at most 37 mN/m.

136. The system of any one of embodiments 130 to 135, wherein (i) the surface tension $\gamma_1$ is larger than $\gamma_0$ by at least 3 mN/m, and/or (ii) the surface tension $\gamma_2$ is larger than $\gamma_0$ by at least 3 mN/m.

137. A method of patterning a surface, the method comprising applying at least one pigment-containing patterning formulation onto a surface to obtain a pattern, the surface being at least partially pre-coated by a pre-coat formulation; the pre-coat formulation having a surface tension $\gamma_0$ and the at least one patterning formulation having a surface tension $\gamma_2$, such that $\gamma_0 < \gamma_2$ at ambient conditions, the at least one patterning formulation comprises an agent being capable of chemically reacting with a complementary agent in the pre-coat formulation.

138. The method of embodiment 137, wherein the chemical reaction between said agent and said complementary agent increases the viscosity of said at least one patterning formulation, optionally wherein said at least one patterning formulation has an initial viscosity $\mu_2^0$ and upon chemical reaction between said agent and said complementary agent, the viscosity of the at least one patterning formulation increases by at least an order of magnitude to a viscosity $\mu_2$.

139. The method of any one of embodiments 137 or 138, wherein said surface is treated with an intermediate formulation prior to applying said patterning formulation, the intermediate formulation having a surface tension $\gamma 1$, such that $\gamma 0 < \gamma 1 \leq \gamma 2$ at ambient conditions.

140. The method of embodiment 139, wherein the agent in the patterning formulation being capable of chemically reacting with at least one other complementary agent in the intermediate formulation, optionally wherein said at least one patterning formulation has an initial viscosity $\mu_2^0$ and upon chemical reaction between said agent and said at least one other complementary agent, the viscosity of the at least one patterning formulation increases by at least an order of magnitude to a viscosity $\mu_2$.

141. The method of any one of embodiments 137 to 140, further comprising allowing said agent to chemically react with at least one of said complementary agent or said other complementary agent.

142. The method of any one of embodiments 137 to 141, wherein said agent is a polymer, oligomer or monomer functionalized with basic functional groups and each of said complementary agent and other complementary agent is, independently, a polymer, oligomer or monomer functionalized with acidic functional groups.

143. The method of any one of embodiments 137 to 142, further comprising exposing the surface to UV-radiation after patterning.

144. A method of patterning a surface, the method comprising:
(a) applying a pre-coat formulation having a surface tension $\gamma_0$ onto said surface to obtain a pre-coat layer;
(b) optionally applying an intermediate formulation having a surface tension $\gamma_1$ onto said pre-coat layer to obtain an intermediate layer;
(c) applying at least one patterning formulation having a surface tension $\gamma_2$ onto said pre-coat layer to obtain a pattern,
wherein $\gamma_0 < \gamma_1 \leq 2$ at ambient conditions, and the patterning formulation comprising an agent being capable of chemically reacting with at least one of (i) a complementary agent in the pre-coat formulation, and (ii) at least one other complementary agent in the intermediate formulation.

145. The method of embodiment 144, wherein the chemical reaction between said agent and at least one of the complementary agents increases the viscosity of said at least one patterning formulation.

146. The method of embodiment 144 or 145, further comprising a step (a1) exposing said pre-coat formulation to irradiation for increasing an initial viscosity $\mu_0^0$ of the pre-coat formulation by at least an order of magnitude to a viscosity $\mu_0$, such that step (a1) being carried prior to application of any of the intermediate coat or the patterning formulations, optionally wherein said irradiation at steps (a1) or (b1) is applied at a wavelength of between about 365 and 470 nm.

147. The method of any one of embodiments 144 to 146, when an intermediate formulation is applied, further comprising a step (b1) exposing said intermediate formulation to irradiation for increasing an initial viscosity $\mu_1^0$ of the intermediate formulation by at least an order of magnitude to a viscosity $\mu_1$, such that step (b1) being carried prior to application of the patterning formulation, optionally wherein said irradiation at steps (a1) or (b1) is applied at a wavelength of between about 365 and 470 nm.

148. The method of any one of embodiments 144 to 147, wherein the pattern at least partially penetrates one or both of the pre-coat layer and the intermediate layer.

149. A kit comprising:
a first container comprising a pre-coat formulation,
optionally a second container comprising an intermediate formulation,
and at least one third container comprising at least one patterning formulation; the pre-coat formulation having a surface tension $\gamma_0$, the intermediate formulation having a surface tension $\gamma 1$, and the at least one patterning formulation having a surface tension $\gamma_2$, such that $\gamma_0 < \gamma_1 \leq \gamma_2$ at ambient conditions, the patterning formulation comprising an agent being capable of chemically reacting with at least one of (i) a complementary agent in the pre-coat formulation, and (ii) at least one other complementary agent in the intermediate formulation.

The invention claimed is:

1. A patterned article, comprising:
an article having a surface;
a transparent pre-coat layer on a region of said surface, the transparent pre-coat layer comprises at least two patterned regions differing from each other in at least one of a chemical and a physical property, said at least one chemical or physical property differing between at least two of said patterned regions is selected from the group consisting of at least one of composition, degree of curing, viscosity, tackiness, surface tension, chemical reactivity, and pH; and
at least one layer of a patterning formulation being in interaction with the transparent pre-coat layer, the interaction between the patterning formulation layer and the transparent pre-coat layer being determined by said chemical and physical property, such that the patterning formulation layer being (i) at least partially embedded within said transparent pre-coat layer, or (ii) maintained on top of the transparent pre-coat layer.

2. The patterned article of claim 1, wherein said transparent pre-coat layer is obtained by patterning a first sub-layer of a first pre-coat formulation and a second sub-layer applied thereonto of a second, different, pre-coat formulation, such that said at least two patterned regions differ from each other in the ratio between the first and second sub-layers.

3. The patterned article of claim 2, wherein the ratio of said first sub-layer to said second sub-layer in each of said at least two patterned regions is independently in the range of between 0:100% and 100%:0.

4. The patterned article of claim 1, wherein said at least two of said patterned regions differ from one another by their thickness.

5. The patterned article of claim 1, further comprising a layer of intermediate composition, disposed onto said transparent pre-coat layer, and interacting with said transparent pre-coat layer, such that the intermediate formulation layer being (i) at least partially embedded within said transparent pre-coat layer, or (ii) maintained on top of the transparent pre-coat layer.

6. The patterned article of claim 1, wherein at least one of said at least two patterned regions is coated by pre-coat of a first thickness and at least one other of said at least two patterned regions being coated by pre-coat of a second thickness, said second thickness being larger than said first thickness.

7. The patterned article of claim 1, wherein said at least one pre-coat transparent formulation comprises an agent being capable of chemically reacting with a complementary agent in said at least one patterning formulation.

8. The patterned article of claim 1, wherein each of the at least two patterned regions comprises at least one photo-initiator, and each of the at least two patterned regions comprises a different photo-initiator.

9. The patterned article of claim 1, wherein each of the at least two patterned regions comprises at least one photo-initiator, and each of the at least two patterned regions comprises a different amount of photo-initiator.

10. The patterned article of claim 1, wherein each of the at least two patterned regions comprises at least one photo-initiator, and each of the at least two patterned regions comprises a different combination of photo-initiators.

11. A patterned article, comprising:
- an article having a surface;
- a transparent pre-coat layer on a region of said surface, the transparent pre-coat layer having gradual variability of at least one chemical or physical property along a defined linear direction, said physical or chemical property being at least one of composition, degree of curing, viscosity, tackiness, surface tension, chemical reactivity, and pH; and
- at least one layer of a patterning formulation being in interaction with the transparent pre-coat layer, the interaction between the patterning formulation layer and the pre-coat layer being determined by physical or chemical property, such that the patterning formulation is (i) at least partially embedded within said transparent pre-coat layer, or (ii) maintained on top of the transparent pre-coat layer.

12. The patterned article of claim 11, wherein said at least one layer of patterning formulation is a line pattern.

13. The patterned article of claim 12, wherein said line pattern is along said linear direction.

14. The patterned article of claim 11, wherein said transparent pre-coat layer has a gradually increasing or a gradually decreasing thickness along the linear direction.

15. The patterned article of claim 12, wherein said line pattern is a continuous line, having at least one first section embedded in the layer of pre-coat formulation and at least one second section, continuous with the first section, maintained at the top of the layer of the pre-coat formulation.

16. The patterned article of claim 11, further comprising a layer of intermediate composition, disposed onto said transparent pre-coat layer, and interacting with said transparent pre-coat layer, such that the intermediate formulation layer being (i) at least partially embedded within said transparent pre-coat layer, or (ii) maintained on top of the pre-coat layer.

17. The patterned article of claim 11, wherein said transparent pre-coat layer comprises a first sub-layer of a first pre-coat formulation and a second sub-layer applied thereonto of a second, different, pre-coat formulation, such that said at least two regions differ from each other in the ratio between the first and second sub-layers.

18. The patterned article of claim 17, wherein the ratio of said first sub-layer to said second sub-layer in each of said at least two regions is independently in the range of between 0:100% and 100%:0.

* * * * *